(12) United States Patent
Malpede et al.

(10) Patent No.: US 10,914,284 B2
(45) Date of Patent: Feb. 9, 2021

(54) WIND TURBINE BLADE

(71) Applicant: Act Blade Limited, Edinburgh (GB)

(72) Inventors: Sabrina Maria Malpede, Edinburgh (GB); Donald William MacVicar, Donaghadee (GB)

(73) Assignee: ACT BLADE LIMITED, Edinburgh (GB)

(*) Notice: Subject to any disclaimer, the term of this patent is extended or adjusted under 35 U.S.C. 154(b) by 149 days.

(21) Appl. No.: 15/767,859

(22) PCT Filed: Oct. 10, 2016

(86) PCT No.: PCT/GB2016/053149
§ 371 (c)(1),
(2) Date: Apr. 12, 2018

(87) PCT Pub. No.: WO2017/064475
PCT Pub. Date: Apr. 20, 2017

(65) Prior Publication Data
US 2018/0298878 A1  Oct. 18, 2018

(30) Foreign Application Priority Data

Oct. 12, 2015  (GB) .................................. 1518041.7

(51) Int. Cl.
*F03D 1/06* (2006.01)
*F01D 5/14* (2006.01)
(52) U.S. Cl.
CPC ........... *F03D 1/0675* (2013.01); *F01D 5/147* (2013.01); *F05B 2280/6001* (2013.01); *F05B 2280/6002* (2013.01); *Y02E 10/72* (2013.01)

(58) Field of Classification Search
CPC ........ F03D 1/06; F03D 1/0633; F03D 1/0675; F03D 1/0683; F01D 5/147; F05B 2240/31
See application file for complete search history.

(56) References Cited

U.S. PATENT DOCUMENTS

| | | | |
|---|---|---|---|
| 7,077,628 B1 * | 7/2006 | Acord ..................... | F03D 3/067 415/4.2 |
| 7,789,343 B2 * | 9/2010 | Sarh .......................... | B64C 3/54 244/46 |
| 8,240,962 B2 | 8/2012 | Livingston et al. | |
| 8,678,324 B2 * | 3/2014 | Hemmelgarn ............ | B64C 3/48 244/219 |
| 8,899,923 B2 * | 12/2014 | Hancock ............... | F03D 1/0641 416/23 |
| 9,534,580 B2 * | 1/2017 | Yerramalli ............ | F03D 1/0683 |
| 9,803,617 B2 * | 10/2017 | Merzhaeuser ........ | F03D 1/0675 |

(Continued)

FOREIGN PATENT DOCUMENTS

| | | |
|---|---|---|
| CN | 101649806 A | 2/2010 |
| CN | 101846042 A | 9/2010 |

(Continued)

*Primary Examiner* — Nathaniel E Wiehe
*Assistant Examiner* — Jackson N Gillenwaters
(74) *Attorney, Agent, or Firm* — Fox Rothschild LLP

(57) ABSTRACT

A wind turbine blade comprises an external skin comprising tensioned fabric supported along a majority of the length of the wind turbine blade by two or more elongate fabric supporting members. The external skin is connected to each of the two or more elongate fabric supporting members.

19 Claims, 9 Drawing Sheets

(56) References Cited

U.S. PATENT DOCUMENTS

| | | | | |
|---|---|---|---|---|
| 2014/0119933 A1* | 5/2014 | Bagepalli | ............. | F03D 1/0675 416/226 |
| 2017/0130695 A1* | 5/2017 | Agtuca | ................ | F03D 7/0236 |
| 2017/0363064 A1* | 12/2017 | Bae | ....................... | F03D 1/0633 |

FOREIGN PATENT DOCUMENTS

| | | | |
|---|---|---|---|
| CN | 102146880 | A | 8/2011 |
| CN | 101545460 | B | 10/2013 |
| CN | 203867783 | U | 10/2014 |
| DE | 202011101014 | U1 | 8/2011 |
| EP | 2535564 | A1 | 12/2012 |
| EP | 2728167 | A2 | 5/2014 |
| EP | 2740929 | A2 | 6/2014 |
| ES | 1089054 | U | 9/2013 |
| FR | 2292878 | A1 | 6/1976 |
| KR | 20110116288 | A | 10/2011 |
| WO | 2005/050007 | A1 | 6/2005 |

\* cited by examiner

WIND TURBINE BLADE

FIELD OF THE INVENTION

The invention relates to wind turbine blades.

BACKGROUND TO THE INVENTION

Wind turbines for generating electricity from atmospheric air flows are now well known. Wind turbines typically comprise a rotor having several aerofoil-shaped blades extending from a hub connected to a rotatable shaft. The rotor is oriented into the wind such that as air flows across the wind turbine blades, a lift force is exerted on each blade, causing the rotor and the shaft to rotate, and a generator to thereby generate electricity.

The power generated by a wind turbine is directly dependent on the effective surface area swept by the wind turbine blades as they rotate. Accordingly, wind turbines having longer blades typically generate more power. However, as the blade size increases, so does the weight of the blades. There is therefore a need to develop wind turbine blades made of lighter materials, but which are still strong enough to withstand the forces exerted on a wind turbine blade, for the construction of larger blades. This is particularly true for the development of the large, low-weight blades required for state-of-the-art 10 to 20 MW wind turbines. Additionally, there is a need for blades having advanced control features which allow the shapes and properties of the blades to be actively controlled in response to changing wind conditions in order to further improve wind turbine efficiency.

One way to decrease the weight of wind turbine blades is to replace portions of the external surface of each blade with tensioned textile. US2014/0119940A1, for example, discloses a wind turbine blade with a self-supporting structural framework having multiple chord-wise members and one or more span-wise members, each of the multiple chord-wise members having an aerodynamic contour. The wind turbine blade also comprises a fabric skin located over the self-supporting structural framework in a tensioned state to generate an aerodynamic surface. The fabric skin is attached via multiple tensioning members to both the chord-wise members and the span-wise members. However, the tensioned fabric surface disclosed in US2014/0119940A1 is divided into multiple portions which run transversely across the blade. The blade also exposes multiple tensioning members which disrupt the external surface of the blade and which are at risk of attracting lightning strikes. US2014/0119940A1 also discloses a large number of internal and external structural components, all of which contribute to the weight of the blade. Moreover, US2014/0119940A1 discloses that the fabric skin portions are tensioned between the multiple tensioning members during construction, but the tension in the fabric skin may not be controlled actively during use.

Accordingly, it would be beneficial to provide a wind turbine blade which is light-weight but which is also stiff and strong. Some embodiments of the invention aim to reduce problems of UV damage to, and erosion of, wind turbine blade outer surfaces. Some embodiments of the invention aim to provide a wind turbine blade which may be transported easily in its separate constituent parts. Some embodiments of the invention aim to provide a wind turbine blade which does not present an increased lightning strike risk.

SUMMARY OF THE INVENTION

A first aspect of the invention provides a wind turbine blade comprising an external skin comprising tensioned fabric supported along a majority of the length of the wind turbine blade by two or more elongate fabric supporting members, the external skin being connected to each of the two or more elongate fabric supporting members.

In use, the wind turbine blade is typically connected to the hub of a wind turbine, the hub itself being fixed to a rotatable shaft. It may be that the wind turbine blade is fixedly attached to the hub of the wind turbine. Alternatively, it may be that the wind turbine blade is connected to the hub by way of a blade tilt control mechanism. The blade tilt control mechanism typically provides controllable tilt of the wind turbine blade. The blade tilt control mechanism may comprise an adjustable pitch and/or yaw mechanism. A plurality of wind turbine blades (for example three such wind turbine blades) each according to the first aspect of the invention are typically connected to (e.g. fixedly attached to) the hub. Together the wind turbine blade(s), the hub and the shaft define a rotor of the wind turbine. Each wind turbine blade is typically oriented such that air flowing towards the rotor and subsequently across the external skin of said wind turbine blade exerts a lift force on said wind turbine blade causing the wind turbine blade, the hub and the shaft to rotate about an axis parallel to, and extending through the centre of, the shaft. The wind turbine typically generates electricity from the resultant rotation of the shaft, for example by the shaft driving an electrical generator.

The external skin comprising tensioned fabric is typically light-weight (e.g. because the fabric is typically light-weight). Accordingly, the overall weight of the wind turbine blade is reduced in comparison to wind turbine blades having outer surfaces made of typical rigid structural materials. This permits use of larger and/or longer blades (for a given blade weight tolerance) which can exert larger torques on the shaft and which can therefore lead to greater wind turbine power output.

The wind turbine blade typically comprises an internal support structure. Preferably, at least one of the two or more elongate fabric supporting members is slidably attached to the internal support structure (thereby coupling the external skin to said internal support structure) such that said at least one of the two or more elongate fabric supporting members is (longitudinally) slidable along at least a portion of the length of the wind turbine blade. It may be that some or more of the two or more elongate fabric supporting members are slidably attached to the internal support structure such that said some or more of the elongate fabric supporting members are (longitudinally) slidable along at least a portion of the length of the wind turbine blade. It may be that each of the two or more elongate fabric supporting members is slidably attached to an internal support structure of the wind turbine blade such that each of said one or more of the two or more elongate fabric supporting members is (longitudinally) slidable along at least a portion of the length of the wind turbine blade.

Accordingly, the invention extends to a wind turbine blade comprising an internal support structure and an external skin which comprises tensioned fabric supported along a majority of the length of the wind turbine blade by two or more elongate fabric supporting members, the external skin being connected to each of the two or more elongate fabric supporting members, the two or more elongate fabric supporting members being slidably attached to said internal support structure such that each of the two or more elongate fabric supporting members is slidable along at least a portion of the length of the wind turbine blade.

It may also be that one or more of the two or more elongate fabric supporting members is fixedly attached to the internal support structure. It may be that some or more of the two or more elongate fabric supporting members are fixedly attached to the internal support structure. It may be that each of the two or more elongate fabric supporting members is fixedly attached to the internal support structure. It may be that one of the two or more elongate fabric supporting members is slidably attached to the internal support structure and that another one of the two or more elongate fabric supporting members is fixedly attached to the internal support structure. It may be that one or more of the two or more elongate fabric supporting members is slidably attached to the internal support structure and that another one or more of the two or more elongate fabric supporting members is fixedly attached to the internal support structure.

Wind turbine blades are typically subject to forces, in use, which cause deflection of the blades as they rotate. Deflection of a typical wind turbine blade can cause deflection of and/or damage to an exterior blade shell. By providing the wind turbine blade of the first aspect of the invention with the external skin comprising tensioned fabric, and by connecting said external skin to the two or more elongate fabric supporting members, wherein at least one of, and typically each of, said two or more elongate fabric supporting members is slidably attached to the internal support structure such that said at least one of, and typically each of, the two or more elongate fabric supporting members is (longitudinally) slidable along at least a portion of the length of the wind turbine blade, the external skin of the wind turbine blade and the internal support structure are able to move independently of one another to an extent as the wind turbine blade (i.e. as the internal support structure) deflects. For example, the external skin is typically able to slide, bend or flow along a portion of the length of the wind turbine blade as said wind turbine blade deflects (e.g. as the internal support structure deflects) without adversely disrupting or damaging the external skin (or an aerodynamic profile of the blade defined principally by the internal support structure in combination with the external skin). The elongate fabric supporting members typically ensure that the external skin is supported and therefore retains a taught, smooth profile as the wind turbine blade deflects. Additionally, the at least one of, and typically each of, the elongate fabric supporting members is typically able to slide along the at least a portion of the length of the wind turbine blade as the wind turbine blade deflects (e.g. as the internal support structure deflects), which typically ensures that said elongate fabric supporting members do not buckle or otherwise deform (which could otherwise disrupt or damage the aerodynamic profile). The elongate fabric supporting members also typically support the external skin against unwanted deformations caused by pressure from the wind or rotational forces.

It may be that the external skin is directly connected to one or more of the elongate fabric supporting members (e.g. to each of the elongate fabric supporting members) but not directly connected to the internal support structure. It may be that the external skin is coupled to the internal support structure by way of said one or more of the elongate fabric supporting members (e.g. by way of each of the elongate fabric supporting members) to which the external skin is directly connected.

It is to be understood that the term "wind turbine blade" typically refers to a portion of a wind turbine blade structure which generates lift from a received flow of air. "Wind turbine blade" does not typically encompass other possible portions of a wind turbine blade structure such as connecting portions (for example, portions of the wind turbine blade structure which connect the wind turbine blade structure to the hub). Accordingly, the "length of the wind turbine blade" typically refers to the length of said portion of a wind turbine blade structure which generates lift from a received flow of air and does not typically refer to a length of the wind turbine blade structure including connecting portions (for example, portions of the wind turbine blade structure which connect the wind turbine blade structure to the hub).

The wind turbine blade is typically a wind turbine blade for a horizontal axis wind turbine. Alternatively, the wind turbine blade may be a wind turbine blade for a vertical axis wind turbine.

It may be that the external skin consists substantially of tensioned fabric. It may be that a majority of the external skin consists of tensioned fabric. It may be that the external skin consists entirely of tensioned fabric. It may be that said external skin is an external tensioned fabric skin. Tensioned fabric typically conforms better to the aerodynamic profile of the wind turbine blade (e.g. of the internal support structure). Tensioned fabric also typically better maintains an aerodynamic profile in use.

It will be understood that the term "fabric" is used to refer to any suitable fabrics, textiles, cloths, laminates or combinations thereof suitable for the construction of the external skin of a wind turbine blade. A fabric may be any flexible woven or non-woven material comprising a network of natural and/or artificial fibres. Said natural and/or artificial fibres may be woven, knitted, crocheted, knotted, felted, bonded or glued together.

It may be that said external skin comprises a thin (tensioned fabric) sheet. It may be that said sheet is thin relative to the dimensions (e.g. the width and/or the breadth) of the wind turbine blade.

It may be that the external skin comprises an external wind-receiving surface. It may be that said external wind-receiving surface consists substantially of tensioned fabric. It may be that a majority of the external wind-receiving surface consists of tensioned fabric. It may be that the external wind-receiving surface consists entirely of tensioned fabric. It may be that said external wind-receiving surface is an external tensioned fabric wind-receiving surface.

It may be that external skin comprises an interior surface proximate the internal support structure. It may be that said interior surface consists substantially of tensioned fabric. It may be that a majority of the interior surface consists of tensioned fabric. It may be that the interior surface consists entirely of tensioned fabric. It may be that said interior surface is an interior tensioned fabric surface. It may be that the external skin consists of tensioned fabric across a complete thickness of said external skin from the external wind-receiving surface to the interior surface proximate the internal support structure. The greater the proportion of the external skin which consists of tensioned fabric, typically the lighter the wind turbine blade.

It may be that the external skin comprising tensioned fabric is supported by the two or more elongate fabric supporting members along at least 70%, or more typically along at least 80%, or more typically along at least 90%, or even more typically along at least 95%, of the length of the wind turbine blade. It may be that the external skin comprising tensioned fabric is supported by the two or more elongate fabric supporting members along the whole length of the wind turbine blade.

It may be that the two or more elongate fabric supporting members extend (longitudinally) along a majority of the length of the wind turbine blade. For example, it may be that the two or more elongate fabric supporting members extend (longitudinally) along at least 70%, or more typically along at least 80%, or more typically along at least 90%, or even more typically along at least 95%, of the length of the wind turbine blade. It may be that the two or more elongate fabric supporting members extend (longitudinally) along the whole length of the wind turbine blade. The longer the two or more elongate fabric supporting members, typically the longer the length of fabric which is supported and thus the fewer the potential number of disruptions to the external skin in use. Alternatively, it may be that the two or more elongate fabric supporting members extend (longitudinally) along only a portion of the length of the wind turbine blade, thereby providing a gap at one or both of a first and second end of each elongate fabric supporting member. The larger the gap provided, typically the longer the distance along which each elongate fabric supporting member is slidable.

It may be that the external skin is slidably attached to each of the two or more elongate fabric supporting members. It may be that the external skin comprises two or more connectors and that the external skin is slidably attached to each of the two or more elongate fabric supporting members by way of said two or more connectors. It may be that said two or more connectors are provided on the interior surface of the external skin. It may be that the interior surface of the external skin is provided with two or more channels, each of the two or more elongate fabric panels being releasably mounted in a respective channel. It may be that each of said two or more channels is formed by a fabric panel (partially) attached to (e.g. bonded to) the interior surface of said external skin.

It may be that each of the two or more elongate fabric supporting members is slidably mounted within a (respective) recess of the internal support structure. For example, it may be that each of the two or more elongate fabric supporting members is slidably mounted within a (respective) groove of the internal support structure. Alternatively, it may be that each of the two or more elongate fabric supporting members is slidably retained within an (respective) aperture of the internal support structure.

The internal support structure typically provides the wind turbine blade with strength and rigidity. The internal support structure may be a wind turbine blade chassis or skeleton. It may be that the external skin covers a significant proportion (a majority) of the internal support structure. For example, the external skin may cover the entirety of the internal support structure. The internal support structure is typically not visible when the wind turbine blade is connected to a wind turbine in use. The internal support structure typically defines the shape of the wind turbine blade. Accordingly, the internal support structure typically defines the aerodynamic profile of the wind turbine blade.

It may be that the internal support structure comprises a (elongate) longitudinal structural support member. It may be that said (elongate) longitudinal structural support member extends (longitudinally) along at least a majority of the length of the wind turbine blade. It may be that said (elongate) longitudinal structural support member extends (longitudinally) along the entire length of the wind turbine blade.

The (elongate) longitudinal structural support member may be a beam, rod, pole or cylinder. It may be that the (elongate) longitudinal structural support member has an elliptical cross section. For example, it may be that the (elongate) longitudinal structural support member has an elliptical cross section in a plane perpendicular to a longitudinal axis of said (elongate) longitudinal structural support member. An (elongate) longitudinal structural support member having an elliptical cross section is typically torsionally stiff.

It may be that the width and/or breadth of the (elongate) longitudinal structural support member varies along the length of said (elongate) longitudinal structural support member. That is to say, the cross-sectional area of the (elongate) longitudinal structural support member (taken in a plane perpendicular to the longitudinal axis) may vary along the length of the (elongate) longitudinal structural support member.

It may be that said wind turbine blade extends longitudinally between a hub end portion and a blade tip portion. In use, the hub end portion of the wind turbine blade may be connected to the hub of the wind turbine. The blade tip portion is typically a portion of the wind turbine blade which is furthest from the hub when in use. It may be that the (elongate) longitudinal structural support member is wider or broader (e.g. the cross-sectional area of the (elongate) longitudinal structural support member is greater) towards (i.e. proximate) the hub end portion and that said (elongate) longitudinal structural support member is narrower or thinner (e.g. the cross-section area of the (elongate) longitudinal structural support member is smaller) towards (i.e. proximate) the blade tip portion.

It may be that the cross-sectional shape of the (elongate) longitudinal structural support member varies along its length. It may be that the (elongate) longitudinal structural support member has a circular cross section towards (i.e. proximate) the hub end portion and an elliptical cross section towards (i.e. proximate) the blade tip portion.

It may be that the (elongate) longitudinal structural support member is hollow.

It may be that the (elongate) longitudinal structural support member comprises carbon fibre or carbon composite materials. The carbon fibre or carbon composite (elongate) longitudinal structural support member is typically light, strong and stiff.

It may be that the internal support structure further comprises a plurality of transverse structural support members arranged along the length of said (elongate) longitudinal structural support member. Said transverse structural support members may comprise rigid transverse support panels. Said transverse support panels may be fixedly attached to or integral with the (elongate) longitudinal structural support member. For example, each of said transverse support panels may comprise a hollow aperture such that each transverse support panel may be slid onto the (elongate) longitudinal structural support member during manufacture of the wind turbine blade. Each hollow aperture may be configured (e.g. dimensioned) for an interference fit with a portion of the (elongate) longitudinal structural support member. Each transverse support panel may comprise one or more flanges which may engage with and/or be fixedly attached to a surface of the (elongate) longitudinal structural support member. Alternatively, the transverse support panels may be integrally formed with the (elongate) longitudinal structural support member.

Each of the plurality of transverse structural support members typically extends (radially) in a direction substantially perpendicular to the surface of the (elongate) longitudinal structural support member (i.e. in a direction substantially perpendicular to the longitudinal axis of the (elongate) longitudinal structural support member). It may be that each of the transverse structural support members extends away from the (elongate) longitudinal structural support member in a plane substantially perpendicular to the longitudinal axis of the (elongate) longitudinal structural support member.

The plurality of transverse structural support members are typically spaced apart from one another along the length of the (elongate) longitudinal structural support member. For example, the shortest distance between adjacent transverse structural support members may be constant along the length of the (elongate) longitudinal structural support member.

Each of the plurality of transverse structural support members typically defines an aerodynamic shape (i.e. profile) in a plane perpendicular to the (elongate) longitudinal structural support member (i.e. in the plane of each transverse structural support member). The external skin is typically supported by (in part) a supporting edge of each of the plurality of transverse structural support members.

It may be that the external skin comprises a suction surface and a pressure surface both extending between a leading edge and a trailing edge of the wind turbine blade, thereby defining an aerodynamic profile. When air (i.e. wind) flows over the suction surface and the pressure surface of the wind turbine blade from the leading edge to the trailing edge, a pressure gradient is typically generated between said suction surface and said pressure surface, resulting in a lift force acting on the wind turbine blade. A torque, therefore, is typically exerted on the hub of the wind turbine, thereby causing the hub to rotate. Accordingly, the aerodynamic shape (i.e. profile) of each transverse structural support member typically comprises a suction edge portion, a pressure edge portion, a leading edge portion and a trailing edge portion of each supporting edge. The external skin typically extends across one or more portions of the supporting edge of each of the plurality of transverse structural support members. Accordingly, portions of the external skin supported by pressure edge portions of the supporting edges of the plurality of transverse structural support members typically define the pressure surface of the external skin. Portions of the external skin supported by suction edge portions of the supporting edges of the plurality of transverse structural support members typically define the suction surface of the external skin. Portions of the external skin supported by leading edge portions of the supporting edges of the plurality of transverse structural support members typically define the leading edge of the external skin. Portions of the external skin supported by trailing edge portions of the supporting edges of the plurality of transverse structural support members typically define the trailing edge of the external skin.

The cross-sectional area (in a plane perpendicular to the longitudinal axis of the (elongate) longitudinal structural support member, i.e. in the plane of each transverse structural support member) of each of the plurality of transverse structural support members typically varies along the length of the (elongate) longitudinal structural support member. For example, it may be that the cross-sectional area of those transverse structural support members towards (i.e. proximate) the hub end portion of the (elongate) longitudinal structural support member is greater and that the cross-sectional area of those transverse structural support members towards (i.e. proximate) the blade tip portion of the (elongate) longitudinal structural support member is smaller.

It may be that the shape (i.e. the profile) of each of the plurality of transverse structural support members in a plane perpendicular to the longitudinal axis of the (elongate) longitudinal structural support member (i.e. in the plane of each transverse structural support member) varies along the length of the (elongate) longitudinal structural support member. The plurality of transverse structural support members may therefore define an aerodynamic shape (i.e. profile) of the wind turbine blade along the majority (e.g. the entirety) of its length.

By surrounding the (elongate) longitudinal structural support member with the plurality of transverse structural support members and/or the external skin, the (elongate) longitudinal structural support member is not exposed to the surrounding atmosphere and the risk of lightning striking the (elongate) longitudinal structural support member is reduced (compared to wind turbine blades having structural support members provided on an external surface thereof).

It may be that at least one of, and typically each of, the two or more elongate fabric supporting members is slidably mounted within a (respective) recess of at least one of said transverse structural support members. For example, it may be that at least one of, and typically each of, the two or more elongate fabric supporting members is slidably mounted within a (respective) groove of at least one of said transverse structural support members. Alternatively, it may be that at least one of, and typically each of, the two or more elongate fabric supporting members is slidably retained within an (respective) aperture of at least one of said transverse structural support members. It may be that at least one of, and typically each of, the two or more elongate fabric supporting members is slidably mounted within a (respective) recess (e.g. groove and/or aperture) of two or more of said transverse structural support members. It may be that at least one of, and typically each of, the two or more elongate fabric supporting members is slidably mounted within a (respective) recess (e.g. groove and/or aperture) of each of the transverse structural support members.

It may be that each recess (e.g. groove and/or aperture), within which a (respective) one of the two or more elongate fabric supporting member is mounted, is provided on or adjacent to a supporting edge of a respective transverse structural support member (e.g. transverse support panel).

It may be that the (elongate) longitudinal structural support member comprises a pole extending (longitudinally) along at least the majority of the length of the wind turbine blade, wherein the plurality of transverse structural support members comprises a plurality of ribs (e.g. rib panels) extending transversely from said pole (i.e. in a direction perpendicular to a longitudinal axis of said pole), and wherein at least one of, and typically each of, the two or more elongate fabric supporting members is slidably mounted within a (respective) recess (e.g. a groove or aperture) of at least one of said ribs (e.g. rib panels). It may be that at least one of, and typically each of, the two or more elongate fabric supporting members is slidably mounted within a (respective) recess (e.g. a groove or aperture) of two or more of said ribs (e.g. rib panels). It may be that at least one of, and typically each of, the two or more elongate fabric supporting members is slidably mounted within a (respective) recess (e.g. a groove or aperture) of a majority of said ribs (e.g. rib panels). It may be that at least one of, and typically each of, the two or more elongate fabric supporting members is slidably mounted within a (respective) recess (e.g. a groove or aperture) of all of said ribs (e.g. rib panels).

It may be that the external skin consists of one (continuous) fabric sheet. It may be that said (continuous) fabric sheet is formed as a (continuous) tube or sock. It may be that first and second (parallel) edges of said (continuous) fabric sheet are connected to one another along the majority of the length of the wind turbine blade to thereby form said external skin (i.e. the (continuous) tube or sock). For example, it may be that said first and second (parallel) edges are bonded, glued, stitched or otherwise attached to one another along the majority of the length of the wind turbine blade to form said external skin (i.e. the (continuous) tube or sock).

It may be that the external skin is formed of fabric continuously along the majority of the length of the wind turbine blade. It may be that the external skin is formed by two or more fabric panels connected to one another around the wind turbine blade, each of said two or more fabric panels extending along a respective portion of the majority of the length of the wind turbine blade. For example, it may be that said two or more fabric panels are bonded, glued, stitched or otherwise attached to one another around the wind turbine blade. It may be that the external skin is formed by three or more fabric panels connected to one another around the wind turbine blade, each of said two or more fabric panels extending along a respective portion of the majority of the length of the wind turbine blade. It may be that the external skin is formed by four or more fabric panels connected to one another around the wind turbine blade, each of said two or more fabric panels extending along a respective portion of the majority of the length of the wind turbine blade. It may be that the external skin is formed by five or more fabric panels connected to one another around the wind turbine blade, each of said two or more fabric panels extending along a respective portion of the majority of the length of the wind turbine blade.

It may be that the external skin comprises tensioned fabric which extends (longitudinally) along at least 70%, more typically along at least 80%, more typically at least along 90%, or even more typically along at least 95%, of the length of the wind turbine blade.

It may be that the external skin consists of two or more fabric panels connected to one another along the majority of the length of the wind turbine blade. It may be that the external skin consists of three or more fabric panels connected to one another along the majority of the length of the wind turbine blade. It may be that the external skin consists of four or more fabric panels connected to one another along the majority of the length of the wind turbine blade. It may be that the external skin consists of five or more fabric panels connected to one another along the majority of the length of the wind turbine blade.

It may be that the external skin consists of ten or fewer fabric panels connected to one another along the majority of the length of the wind turbine blade. It may be that the external skin consists of nine or fewer fabric panels connected to one another along the majority of the length of the wind turbine blade. It may be that the external skin consists of eight or fewer fabric panels connected to one another along the majority of the length of the wind turbine blade. It may be that the external skin consists of seven or fewer fabric panels connected to one another along the majority of the length of the wind turbine blade. It may be that the external skin consists of six or fewer fabric panels connected to one another along the majority of the length of the wind turbine blade.

It may be that said two or more, three or more, four or more, five or more, ten or fewer, nine or fewer, eight or fewer, seven or fewer, or six or fewer fabric panels are bonded, glued, stitched or otherwise attached to one another along the majority of the length of the wind turbine blade to form said external skin (i.e. the (continuous) tube or sock).

It may be that each of said two or more, three or more, four or more, five or more, ten or fewer, nine or fewer, eight or fewer, seven or fewer, or six or fewer fabric panels has a constant width along the majority of the length of the wind turbine blade. Alternatively, it may be that one or more of said two or more, three or more, four or more, five or more, ten or fewer, nine or fewer, eight or fewer, seven or fewer, or six or fewer fabric panels has a variable width along with majority of the length of the wind turbine blade. For example, it may be that one or more of said two or more, three or more, four or more, five or more, ten or fewer, nine or fewer, eight or fewer, seven or fewer, or six or fewer fabric panels tapers (in width) along a portion (e.g. a majority) of the length of the wind turbine blade. It may be that some or each of said two or more, three or more, four or more, five or more, ten or fewer, nine or fewer, eight or fewer, seven or fewer, or six or fewer fabric panels differ in length. It may be that some of said two or more, three or more, four or more, five or more, ten or fewer, nine or fewer, eight or fewer, seven or fewer, or six or fewer fabric panels extend along a majority of the length of the wind turbine blade while the others of said two or more, three or more, four or more, five or more, ten or fewer, nine or fewer, eight or fewer, seven or fewer, or six or fewer fabric panels extend only along a portion of the length of the wind turbine blade, said portion being less than said majority of the length of the wind turbine blade.

It may be that each of the two or more elongate fabric supporting members comprises an elongate connector. It may be that each of the two or more elongate fabric supporting members consists of an elongate connector. It may be that the external skin comprises two or more fabric panels connected to one another by said two or more elongate connectors along the majority of the length of the wind turbine blade.

It may be that the two or more fabric panels are held under tension by the two or more elongate connectors.

The two or more fabric panels are typically light-weight panels. Therefore, by forming the external skin of the wind turbine blade by two or more fabric panels (and two or more elongate connectors), the overall weight of the wind turbine blade is reduced (in comparison to wind turbine blades having outer surfaces made of rigid structural materials (such as metal)). This permits use of larger and/or longer blades (for a given blade weight tolerance) which can exert larger torques on the shaft and which can therefore lead to greater wind turbine power output.

Moreover, by connecting the two or more fabric panels to one another along the majority of the length of the wind turbine blade by way of two or more elongate connectors, the external skin of the wind turbine blade is uninterrupted along the length of the wind turbine blade. The fewer the number of disruptions to the external skin of the wind turbine blade along its length, the smoother the flow of air (i.e. wind) over the external skin and thus the greater the efficiency of the wind turbine to which the wind turbine blade may be connected.

Additionally, by holding the two or more fabric panels under tension by way of the two or more elongate connectors, said two or more fabric panels (and thus the external skin of the wind turbine blade) are also held taught and smooth such that there are few disruptions to the flow of air (i.e. wind) thereacross. The two or more fabric panels thereby conform to the aerodynamic shape (i.e. profile) of the wind turbine blade. The tension in the two or more fabric panels is typically adjustable. Accordingly, the aerodynamic shape (i.e. profile) of the wind turbine blade is typically adjustable.

It may be that each of said two or more elongate connectors extends longitudinally along the majority of the length of each respective elongate fabric supporting member. For example, it may be that each of said two or more elongate connectors extends longitudinally along the entire length of each respective elongate fabric supporting member. Accordingly, it may be that each of said two or more elongate connectors extends longitudinally along the majority of the length of the wind turbine blade. For example, it may be that each of the two or more elongate connectors extends longitudinally along at least 70%, more typically along at least 80%, more typically at least along 90%, or even more typically along at least 95%, of the length of the wind turbine blade. It may be that said two or more elongate connectors extend (longitudinally) along the whole length of the wind turbine blade.

It may be that said two or more fabric panels extend longitudinally along the majority of the length of the wind turbine blade. For example, it may be that the two or more fabric panels extend longitudinally along at least 70%, or more typically along at least 80%, or more typically along at least 90%, or even more typically along at least 95%, of the length of the wind turbine blade. It may be that said two or more fabric panels extend (longitudinally) along the whole length of the wind turbine blade.

It may be that the two or more elongate connectors are low profile connectors. For example, it may be that the two or more elongate connectors have a low height profile relative to the wind-receiving external surface of the external skin. Such low profile connectors typically do not protrude substantially beyond the wind-receiving external surface. For example, low profile connectors typically do not protrude more than 1 cm above the wind-receiving external surface, or more typically more than 0.5 cm above the wind-receiving external surface. It may be that said low profile connectors do not protrude above the wind-receiving external surface (at all). The lower the profile of the two or more elongate connectors, the less they disrupt the flow of air (i.e. wind) over the wind turbine blade when in use.

It may be that the two or more fabric panels are releasably connected to one another along the majority of the length of the wind turbine blade by the two or more elongate connectors. This typically allows the fabric panels to be removed and replaced, for example if the panels are damaged.

It may be that the two or more fabric panels together form a (substantially continuous) fabric surface (around the wind turbine blade along the majority of the length of said wind turbine blade) which is interrupted (only) by external surfaces of the two or more elongate connectors, for example. It may be that the two or more elongate connectors are narrow (for example, relative to a width of the two or more fabric panels). For example, it may be that a width of each of the two or more elongate connectors (in a direction around the wind turbine blade perpendicular to a longitudinal axis of said blade) is less than 10% of the width of each of the two or more fabric panels connectors (in said direction around the wind turbine blade perpendicular to the longitudinal axis of said blade), or more typically less than 5% of said width of each of the two or more fabric panels. It may be that the two or more elongate connectors are (sufficiently) narrow such that air (i.e. wind) flowing over the external skin flows substantially similarly to (for example the deflection of said air (i.e. wind) by said external skin is substantially similar to) air (i.e. wind) flowing over a continuous fabric surface having the same three-dimensional shape as said external skin. It may be that the two or more elongate connectors are (sufficiently) narrow such as to avoid significant deflection of air (i.e. wind) flowing over adjacent one or more fabric panels.

In practice, the external skin may be formed in part by the two or more elongate connectors. For example, it may be that the external skin is formed by the two or more fabric panels and any portions of the two or more elongate connectors between said two or more fabric panels. However, in some embodiments the external skin is formed entirely by the two or more fabric panels.

It may be that said external skin comprises a significant proportion (e.g. a majority) of an external surface of the wind turbine blade. It may be that the external skin comprises at least 70%, or more typically at least 80%, or even more typically at least 90%, of the external surface of the wind turbine blade. For example, it may be that said external skin comprises the entire external surface of the wind turbine blade.

It may be that said two or more fabric panels together wrap around the wind turbine blade along the majority of its length. For example, it may be that said two or more fabric panels together wrap around the entire wind turbine blade, thereby defining the entire external skin of the wind turbine blade along the majority of its length. It may be that a perimeter of any cross section taken through the wind turbine blade (in a plane perpendicular to the longitudinal axis of the wind turbine blade) along the majority of its length comprises portions of each of the two or more fabric panels and portions of each of the two or more elongate connectors. It may be that more than 90%, or more typically more than 95%, of the perimeter of any cross section taken through the wind turbine blade (in a plane perpendicular to the longitudinal axis of the wind turbine blade) along the majority of its length consists of portions of each of the two or more fabric panels.

It may be that each of the two or more elongate connectors comprises first and second elongate channels, the first said channel retaining an edge of one of the two or more fabric panels and the second said channel retaining an edge of another of the two or more fabric panels. It may be that said first and second channels resist sliding of the retained fabric panels in a direction perpendicular to the length of the wind turbine blade (i.e. perpendicular to the longitudinal axis of the wind turbine blade). It may be that said first and second channels permit sliding of the retained fabric panels in a longitudinal direction along the length of the wind turbine blade (i.e. parallel to the longitudinal axis of the wind turbine blade). It may be that the edge of the one of the two or more fabric panels and the edge of the another of the two or more fabric panels are both bolt rope terminated edges of said respective fabric panels.

The two or more elongate connectors may be made of one or more (rigid) plastics materials. The two or more elongate connectors may be made of metal. The two or more elongate connectors may be made of one or more composite materials. For example, the two or more elongate connectors may be made of glass-reinforced plastic (GRP) (i.e. fibreglass) and/or or carbon-fibre-reinforced plastic (CRP).

It may be that each of the two or more fabric panels comprises a laminate textile comprising alternating layers of fabrics. Said fabrics may be woven fabrics and/or non-woven fabrics. Said laminate textile or one or more of said woven or non-woven fabrics typically has one or more of the following advantageous properties: a high strength to weight ratio, a high stiffness to weight ratio, a high tear resistance, a high abrasion and puncture resistance, a low air porosity over the temperature range −10° C. to 40° C., low or zero water permeability, low light permeability, low radiant heat absorption, low creep, and/or low or zero stretch. Said laminate textile or one or more of said woven or non-woven fabrics is typically bondable to create joints. Said laminate textile or one or more of said woven or non-woven fabrics is typically fire retardant.

It may be that the laminate textile comprises two or more layers. It may be that the laminate textile comprises woven aramid (e.g. Technora) materials. It may be that the laminate textile comprises liquid crystal polymer (e.g. Vectran) materials. It may be that the laminate textile comprises one or more resin polyethylene terephthalate (e.g. Mylar) sheets. It may be that the laminate textile comprises a scrim material (e.g. a woven aramid scrim such as Technora scrim). A scrim material typically comprises a coarsely-woven (i.e. a loose weave) fabric and typically provides the laminate textile with strength. It may be that the laminate comprises a UV protection film such as a polyvinyl fluoride film (e.g. Tedlar). Said UV protection film may be an outermost layer of the textile (i.e. a layer of the textile forming the wind-receiving external surface of the fabric skin).

It may be that the laminate textile comprises an outer coating. Said outer coating may have one or more of the following advantageous properties: high humidity resistance, stable physical and chemical properties in the temperature range −10° C. to 40° C., UV resistance up to a solar radiation intensity of 1000 $Wm^{-2}$, low air porosity in the temperature range −10° C. to 40° C., no water permeability, low light permeability, low radiant heat absorption, puncture resistance, rain erosion resistance, low surface friction, and/or a glass transition temperature ($T_g$) above a minimum value of 40° C.

It may be that the two or more elongate connectors extend from the hub end portion to the blade tip portion. Alternatively, it may be that the two or more elongate connectors extend from proximate the hub end portion to proximate the blade tip portion.

It may be that the two or more fabric panels extend from the hub end portion to the blade tip portion. Alternatively, it may be that the two or more fabric panels extend from proximate the hub end portion to proximate the blade tip portion.

It may be that the external skin of the wind turbine blade is defined by two or more fabric panels, each of said two or more fabric panels having a first edge and a second edge different from said first edge, wherein the first edge of each said panel is connected to the second edge of one other said panel along the majority of the length of the wind turbine blade by one elongate connector, wherein the second edge of each said panel is connected to the first edge of another said panel along the majority of the length of the wind turbine blade by one other elongate connector, and wherein each of said two or more panels is held under tension by said elongate connectors.

For example, it may be that the external skin is defined by first and second fabric panels, each of said first and second fabric panels having a first edge and a second edge different from said first edge, wherein the first edge of the first panel is connected to the second edge of the second panel along the majority of the length of the wind turbine blade by a first elongate connector and the first edge of the second panel is connected to the second edge of the first panel along the majority of the length of the wind turbine blade by a second elongate connector. Alternatively, it may be that the external skin is defined by first, second and third fabric panels, each of said first, second and third fabric panels having a first edge and a second edge different from said first edge, wherein the first edge of the first panel is connected to the second edge of the second panel along the majority of the length of the wind turbine blade by a first elongate connector, wherein the first edge of the second panel is connected to the second edge of the third panel along the majority of the length of the wind turbine blade by a second elongate connector, and wherein the first edge of the third panel is connected to the second edge of the first panel along the majority of the length of the wind turbine blade by a third elongate connector. Optionally, said external skin may comprise fourth, fifth, sixth, seventh, eighth, ninth and/or tenth further fabric panels, in which case each further fabric panel typically has a first edge and a second edge different from said first edge, the first edge of each said further fabric panel typically being connected to a second edge of one other said fabric panel (i.e. one of the first, second, third, fourth, fifth, sixth, seventh, eighth, ninth or tenth fabric panels) along the majority of the length of the wind turbine blade by an elongate connector, and the second edge of each said further fabric panel typically being connected to the first edge of another said fabric panel (i.e. one of the first, second, third, fourth, fifth, sixth, seventh, eighth, ninth or tenth fabric panels) along the majority of the length of the wind turbine blade by another elongate connector.

It may be that the first edge and the second edge of each of the two or more fabric panels extend along the majority of the length of the wind turbine blade. It may be that the first edge and the second edge of each of the two or more fabric panels extend along the whole length of the wind turbine blade. It may be that the first edge and the second edge of each of the two or more fabric panels extend from the hub end portion to the blade tip portion. Alternatively, it may be that the first edge and the second edge of each of the two or more fabric panels extend from proximate the hub end portion to proximate the blade tip portion.

Accordingly, it may be that a connection between each pair of adjacent fabric panels from the said two or more fabric panels (said connection formed by one or more of the two or more elongate connectors) extends along the majority of the length of the wind turbine blade. It may be that said connection between each pair of adjacent fabric panels from the said two or more fabric panels extends along the whole the length of the wind turbine blade. It may be that the connection between each pair of adjacent fabric panels from the said two or more fabric panels extends from the hub end portion to the blade tip portion. Alternatively, it may be that the connection between each pair of adjacent fabric panels from the said two or more fabric panels extends from proximate the hub end portion to proximate the blade tip portion.

It may be that the wind turbine blade has three or more fabric panels and a corresponding number of elongate connectors. It may be that the wind turbine blade has four or more fabric panels and a corresponding number of elongate connectors. It may be that the wind turbine blade has five or more fabric panels and a corresponding number of elongate connectors. Said two or more, three or more, four or more, or five or more fabric panels are typically connected to one another around the wind turbine blade along the majority of the length of the wind turbine blade.

It may be that the wind turbine blade has ten or fewer fabric panels and a corresponding number of elongate connectors. It may be that the wind turbine blade has nine or fewer fabric panels and a corresponding number of elongate connectors. It may be that the wind turbine blade has eight or fewer fabric panels and a corresponding number of elongate connectors. It may be that the wind turbine blade has seven or fewer fabric panels and a corresponding number of elongate connectors. It may be that the wind turbine blade has six or fewer fabric panels and a corresponding number of elongate connectors. It may be that the wind turbine blade has five or fewer fabric panels and a corresponding number of elongate connectors. Said ten or fewer, nine or fewer, eight or fewer, seven or fewer, six or fewer, or five or fewer fabric panels are typically connected to one another around the wind turbine blade along the majority of the length of the wind turbine blade.

For example, it may be that the wind turbine blade has more than two but fewer than six said fabric panels and more than two but fewer than six said elongate connectors.

The fewer the number of disruptions to the wind-receiving external surface of the external skin, the smoother the flow of air (i.e. wind) over the external skin and thus the greater the efficiency of the wind turbine to which the wind turbine blade may be connected. Since the elongate connectors also hold the fabric panels under tension, by keeping the number of fabric panels low, fewer adjustments to the fabric tension are typically required.

It may be that one of the two or more fabric panels forms a continuous fabric surface across the leading edge of the wind turbine blade. In use, this typically allows air (i.e. wind) to flow uninterrupted over the leading edge. The flow of air (i.e. wind) over the leading edge is thereby typically not disrupted by any of the two or more elongate connectors. Restricting turbulence in the flow as air (i.e. wind) flows onto and across the external skin of the wind turbine blade improves the efficiency of lift generation.

It may be that one of the two or more fabric panels forms a continuous fabric surface across the trailing edge of the wind turbine blade. In use, this typically allows air (i.e. wind) to flow uninterrupted over the trailing edge. The flow of air (i.e. wind) over the trailing edge is thereby typically not disrupted by any of the two or more elongate connectors. Restricting turbulence in the flow of air (i.e. wind) allows air flowing over the wind turbine blade to leave the wind-receiving external surface of the external skin smoothly, thereby improving the efficiency of lift generation.

It may be that at least a portion of the suction surface is convex. For example, it may be that the entirety of the suction surface is convex.

It may be that at least a portion of the pressure surface is concave. For example, it may be that the entirety of the pressure surface is concave.

It may be that the pressure surface comprises at least one concave portion and at least one convex portion. A line of inflection may extend longitudinally along the pressure surface marking a boundary between regions of different surface curvature. It may be that at least one of the two or more elongate connectors extends along the line of inflection of the concave portion of the pressure surface.

It may be that the wind turbine blade further comprises one or more tension control members adjustable to control tension in the external skin. It may be that said one or more tension control members are adjustable to control tension in one or more of said two or more fabric panels. Said one or more tension control members are typically adjustable to control tension in the external skin (e.g. in one or more of said two or more fabric panels) in one or more directions (said one or more directions typically lying in the plane of a local portion of the wind-receiving surface). By controlling the tension in the external skin (e.g. the one or more of said two or more fabric panels), the aerodynamic properties of the wind turbine blade may be controlled. Fine-tuning of the aerodynamic properties of the wind turbine blade may be used to improve (e.g. optimise) the efficiency of said wind turbine blade actively during use for a particular set of wind conditions. For example, optimal levels of fabric tension may depend on instantaneous wind speed or direction, levels of wind turbulence and the speed of rotation of the wind-turbine blade(s).

It may be that one or more of said one or more tension control members is arranged along the trailing edge of the wind turbine blade, thereby being adjustable to control tension in the external skin (e.g. one or more of said two or more fabric panels) in a transverse direction. By a transverse direction, a direction lying in the plane of a local portion of the wind-receiving surface and pointing substantially perpendicular to the longitudinal axis of the wind turbine blade (i.e. transverse directions point around the wind turbine blade) is meant.

Said one or more tension control members may comprise one or more trailing edge beams. Said one or more trailing edge beams may form part of the internal support structure. Said one or more trailing edge beams may be adjustably connected to the internal support structure. Said one or more trailing edge beams may be adjustably connected to one or more of the transverse structural support members. Adjustment of the connection between the one or more trailing edge beams and the internal support structure (e.g. the one or more of the transverse structural support members) may result in movement of said one or more trailing edge beams in a direction substantially perpendicular to the longitudinal axis of the wind turbine blade (and/or the longitudinal axis of the longitudinal structural support members). Movement of the one or more trailing edge beams in said direction away from the longitudinal structural support member typically results in a force being exerted on the external skin (e.g. one or more of said two or more fabric panels) in a direction such that fabric tension in the external skin (e.g. said one or more fabric panels) is increased. Movement of the one or more trailing edge beams in said direction towards the longitudinal structural support member away from the wind-receiving external surface typically results in a reduction in force exerted on the external skin (e.g. one or more of said two or more fabric panels) in a direction such that fabric tension in the external skin (e.g. said one or more fabric panels) is reduced.

It may be that one or more of said one or more tension control members is arranged at the hub end of the wind turbine blade, thereby being adjustable to control tension in the external skin (e.g. one or more of said two or more fabric panels) in a longitudinal direction. By a longitudinal direction, a direction lying in the plane of a local portion of the external skin and pointing substantially parallel to the longitudinal axis of the wind turbine blade (i.e. longitudinal directions point along the wind turbine blade) is meant.

Said one or more tension control members may comprise one or more tension control cables (such as one or more tension control ropes) fixedly attached to or integrally formed with the external skin (e.g. one or more of the two or more fabric panels) towards (i.e. proximate) the hub end portion. It may be that pulling said one or more tension control cables (e.g. ropes) in a direction parallel to the longitudinal axis of the wind turbine blade (and/or the longitudinal axis of the longitudinal structural support member) increases fabric tension in the external skin (e.g. one or more of said two or more fabric panels). It may also be that releasing tension in said one or more tension control cables (e.g. ropes) in said direction parallel to the longitudinal axis of the wind turbine blade (and/or the longitudinal axis of the longitudinal structural support member) reduces fabric tension in the external skin (e.g. one or more of said two or more fabric panels). Said one or more tension control members may further include a mechanism for varying tension in said one or more tension control cables.

DESCRIPTION OF THE DRAWINGS

An example embodiment of the present invention will now be illustrated with reference to the following Figures in which.

DETAILED DESCRIPTION OF AN EXAMPLE EMBODIMENT

First Example Embodiment

Figure 1:
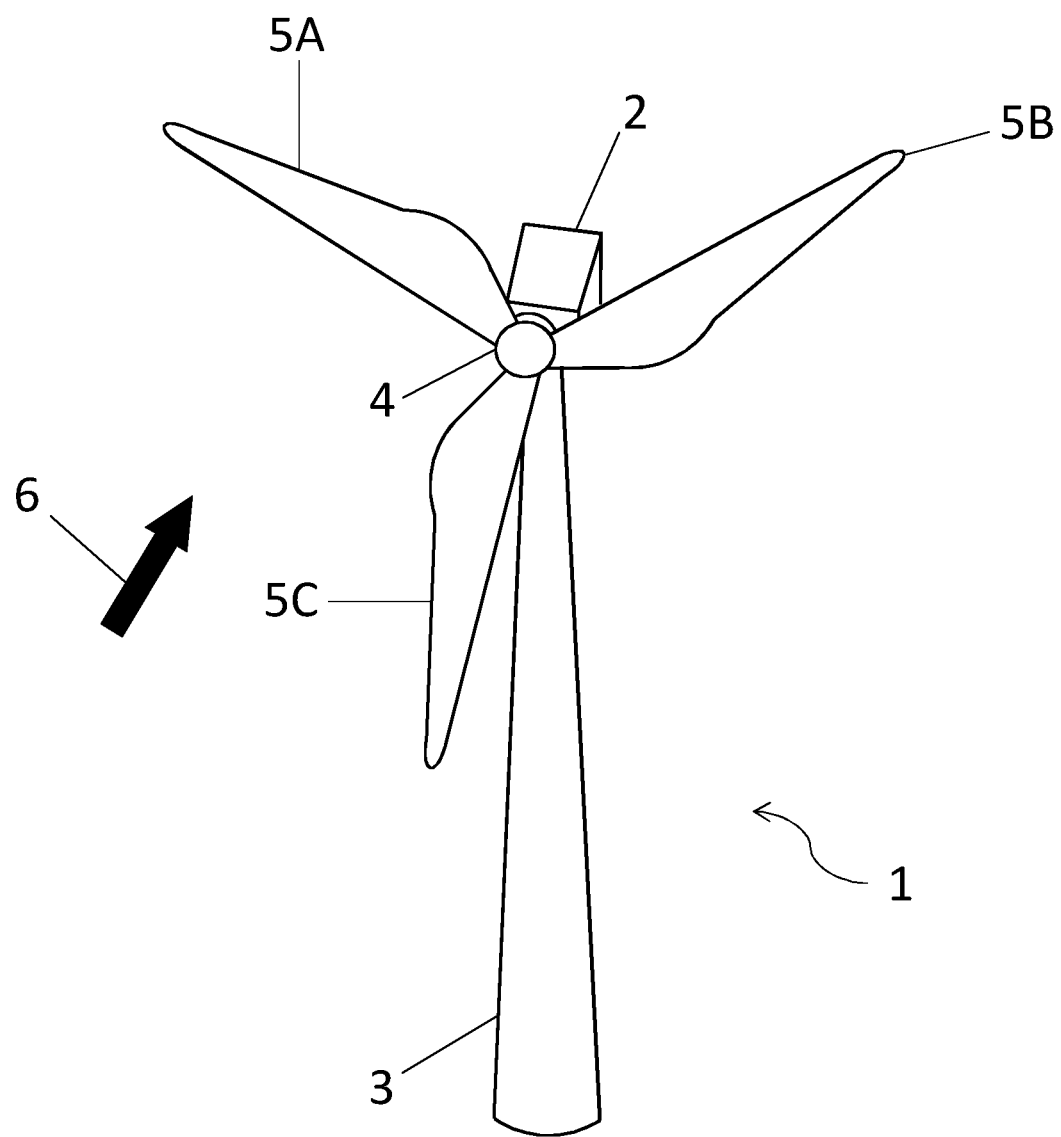
FIG. 1 is a perspective view of a horizontal axis wind turbine.

FIG. 1 shows a horizontal axis wind turbine 1 comprising a nacelle 2 supported on top of a mast 3. The nacelle 2 further supports a hub 4. Three substantially identical wind turbine blades 5A, 5B and 5C extend from said hub 4, together forming a wind turbine rotor.

Figure 2:
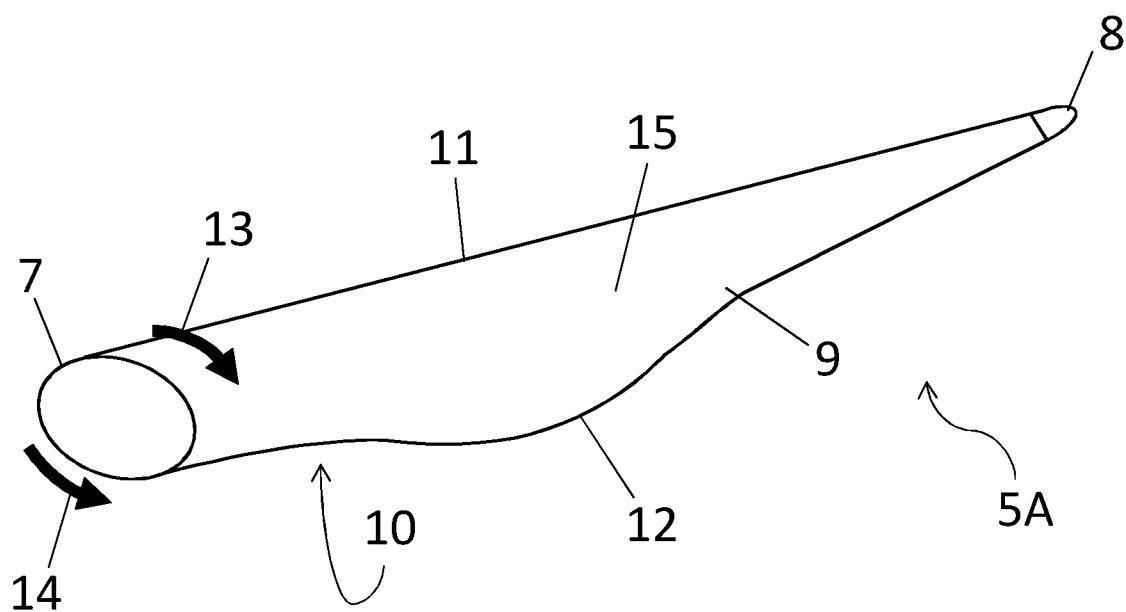
FIG. 2 is a perspective view of a wind turbine blade according to a first example embodiment of the invention.

Wind turbine blade 5A, separate from the rest of the wind turbine 1, is shown in more detail in FIG. 2. Wind turbine blade 5A extends between a hub end 7 and a blade tip 8. The hub end 7 is connected to the hub 4 when in use. Wind turbine blade 5A has a three-dimensional aerodynamic shape comprising a suction surface 9 and a pressure surface 10 which both extend between a leading edge 11 and a trailing edge 12 of the blade 5A.

A wind-receiving fabric surface 15 extends around the blade 5A. The wind-receiving surface 15 includes both the suction surface 9 and the pressure surface 10. The wind-receiving surface 15 is formed from an elongate fabric sock 15 which extends along a length of the blade 5A from the hub end 7 to the blade tip 8 and which wraps around the blade 5A.

As shown in FIG. 1, in use, wind turbine 1 is typically oriented with its rotor facing into the wind such that air flows in a direction indicated by arrow 6 towards the rotor. A portion of the air blowing in direction 6 towards the wind turbine 1 subsequently flows across the aerodynamic surface of each wind turbine blade 5A, 5B and 5C. As shown in FIG. 2, air blowing onto and across the aerodynamic surface of wind turbine blade 5A generally flows from the leading edge 11 to the trailing edge 12 across the suction surface 9 in a direction indicated by arrow 13. Air also generally flows from the leading edge 11 to the trailing edge 12 across the pressure surface 10 in a direction indicated by arrow 14. A pressure gradient between air flowing above the suction surface and air flowing below the pressure surface generates a lift force which causes the wind turbine blade 5A, and the hub 4 to which it is connected in use, to rotate. As air flows over an aerodynamic surface of each of the wind turbine blades 5A, 5B, 5C, a lift force is exerted on each wind turbine blade, thereby causing each wind turbine blade, and the hub 4 from which they extend, to rotate. Rotation of the hub 4 drives rotation of a shaft inside the nacelle 2 from which an electricity generator inside nacelle 2 generates electricity.

Figure 3:
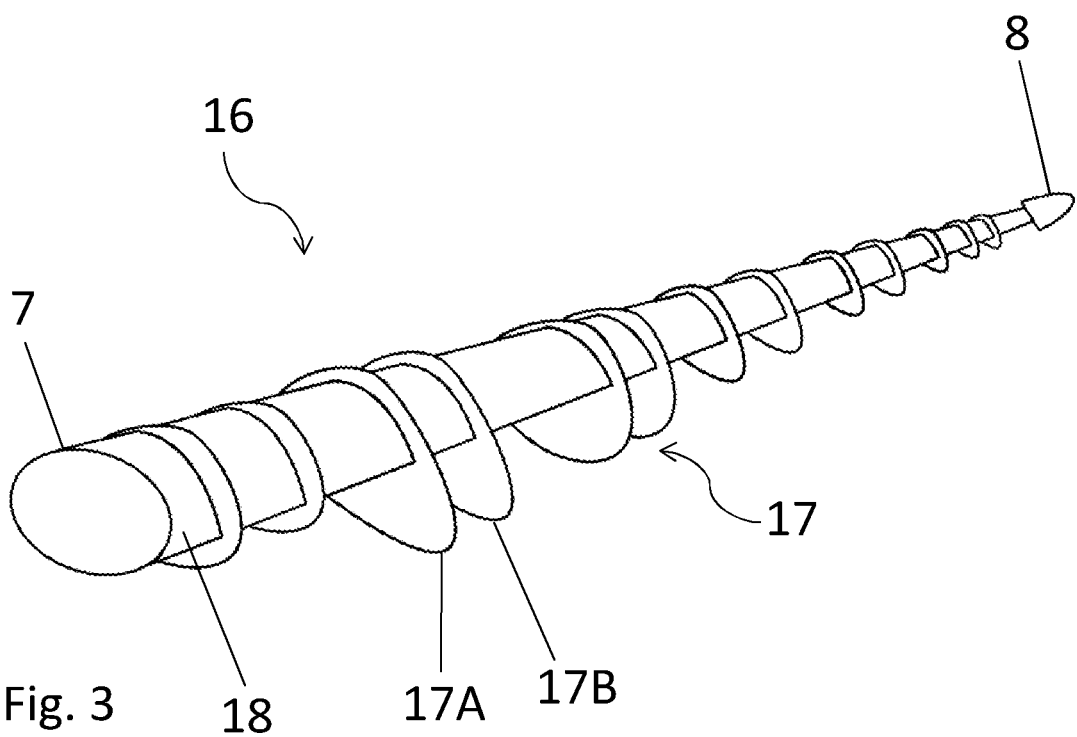
FIG. 3 is a perspective view of an internal support structure of the wind turbine blade of FIG. 2.

FIG. 3 shows an internal skeleton structure 16 of the wind turbine blade 5A when the fabric sock 15 has been removed. The internal structure 16 consists of multiple composite sandwich rib panels 17 extending from a carbon fibre pole 18. The carbon fibre pole 18 has an elliptical cross section. The width of the carbon fibre pole 18 (i.e. the elliptical cross-sectional area of the pole 18) varies continuously along the length of the blade 5A. The carbon fibre pole 18 is thicker towards the hub end 7 and it is thinner towards the blade tip 8. Each of the rib panels 17 consist of a thin composite sandwich plate having an aerodynamic profile. The shapes of the rib panels 17 vary along the length of the blade 5A. The rib panels 17 support the fabric wind receiving surface 15 of the blade 5A, and thus the variation in the shapes of said rib panels 17 defines the aerodynamic profile of the overall blade 5A.

Figure 4:
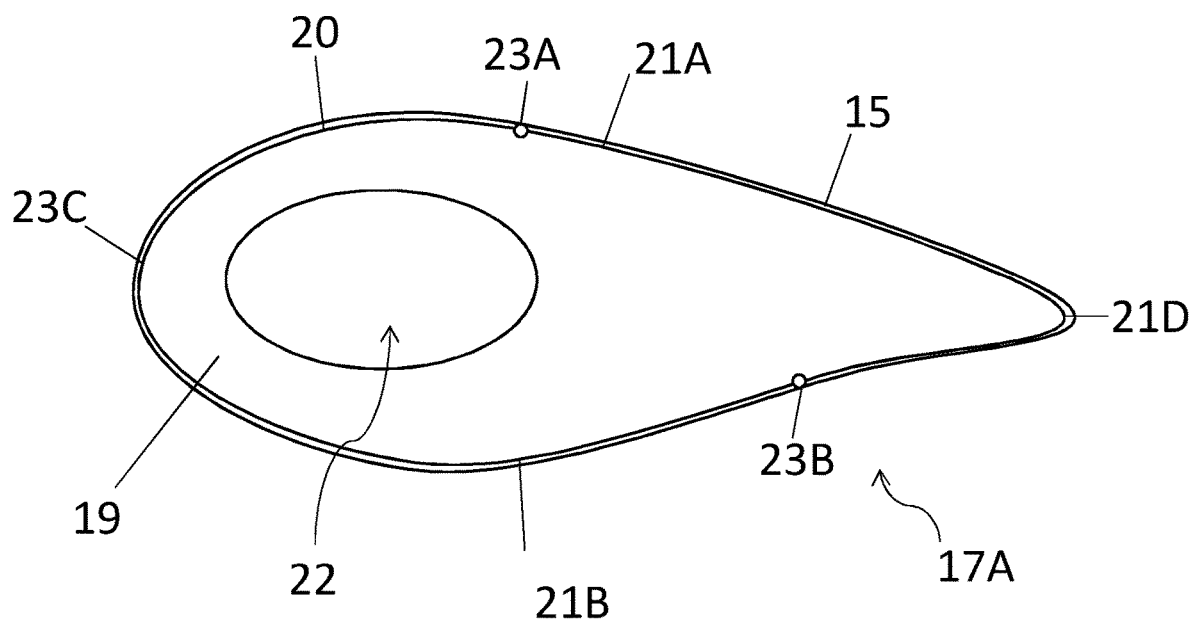
FIG. 4 is a cross section through a transverse rib panel of the internal support structure of FIG. 3.

FIG. 4 shows rib panel 17A in more detail. Rib panel 17A consists of a composite sandwich panel 19 which, when viewed along a longitudinal axis of the blade 5A from the hub end 7 to the blade tip 8, has an aerodynamic profile defined by a panel edge 20. Panel edge 20 can be divided into suction surface edge portion 21A, pressure surface edge portion 21B, leading edge portion 21C and trailing edge portion 21D. An elliptical aperture 22 is provided through the thickness of the composite sandwich panel 19 configured to provide an interference fit around the elliptical pole 18.

When in use, the fabric sock 15 is wrapped around and is supported by, in part, rib panel 17A. Fabric sock 15 is coupled to each of the rib panels 17 along the longitudinal length of the blade 5A by two elongate fabric supporting members 23A and 23B. Elongate fabric supporting member 23A is slidably attached to the suction surface edge portion 21A of composite sandwich panel 19. Elongate fabric supporting member 23B is slidably attached to the pressure surface edge portion 21B of composite sandwich panel 19.

Figure 5:
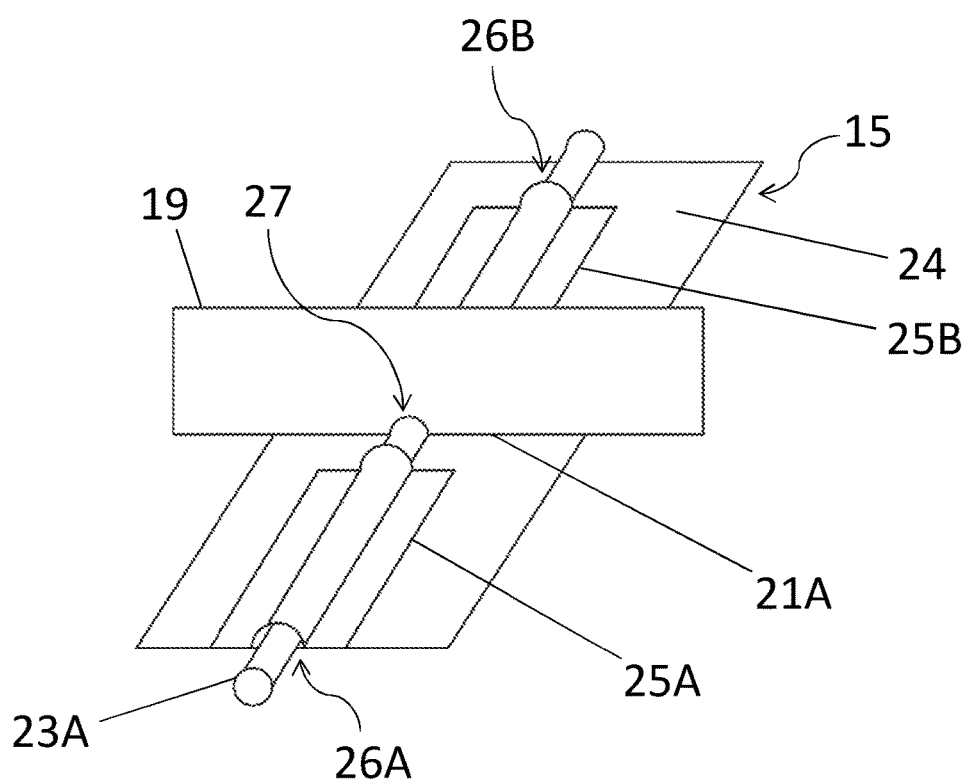
FIG. 5 is a more detailed perspective view of a connection between an elongate fabric supporting member, a fabric skin and the transverse rib panel of FIG. 4.

FIG. 5 shows in greater detail how fabric sock 15, elongate fabric supporting member 23A and composite sandwich panel 19 are connected to one another. Elongate fabric supporting member 23A is slidably connected to an interior surface 24 of fabric sock 15 by fabric pockets 25A and 25B bonded to the interior surface 24. The fabric pockets 25A and 25B each form elongate open channels 26A and 26B respectively along which the elongate fabric supporting member 23A is slidable. An aperture 27 is also formed in the suction surface edge portion 21A of composite panel 19 through which elongate fabric supporting member 23A is slidable. Elongate fabric supporting member 23A is therefore slidably retained within fabric pockets 25A and 25B and aperture 27. Elongate fabric supporting member 23A, fabric sock 15 and composite rib panel 19 are therefore all slidable with respect to one another in a direction along the length of elongate fabric supporting member 23A (and also, therefore, along the length of the wind turbine blade 5A). Elongate fabric supporting member 23A is similarly slidably coupled to each composite rib panel 17 and to the interior surface 24 of the fabric sock 15 adjacent to and on either side of each composite rib panel 17. Elongate fabric supporting member 23B is similarly slidably coupled to the pressure surface edge 21B of each composite rib panel 17 and to the interior surface 24 of the fabric sock 15 adjacent to and on either side of each composite rib panel 17.

Figure 6:
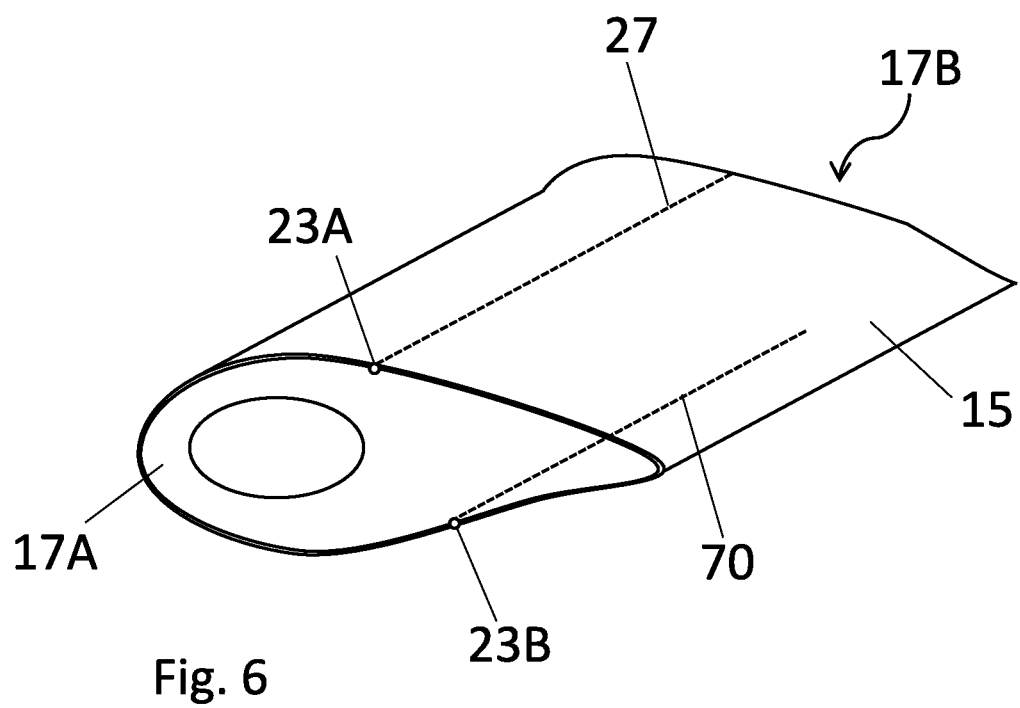
FIG. 6 is a perspective view of a section of the wind turbine blade of FIG. 2.

FIG. 6 shows a portion of the wind turbine blade 5A between rib panels 17A and 17B. Elongate fabric supporting members 23A and 23B are slidably attached to each rib panel in approximately equivalent positions around the panel edge of each said rib panel. Elongate fabric supporting members 23A and 23B extend between each rib panel (dashed line 27 indicates the line along which elongate fabric supporting member 23A extends between rib panels 17A and 17B) and therefore support the fabric sock 15 between each rib panel. Fabric sock 15 is dimensioned and positioned so as to be pulled taught between adjacent rib panels along the longitudinal axis of the wind turbine blade 5A. The wind-receiving surface 15 formed by fabric sock 15 supported by rib panels 16A and 16B, and by elongate fabric supporting members 23A and 23B, is therefore a taught, smooth, aerodynamic surface presenting few interruptions or features capable of disrupting the smooth flow of air thereacross. A line of inflection (dashed line 70) extends longitudinally along the pressure surface, marking the boundary between regions of different surface curvature.

Because the fabric sock 15, the elongate fabric supporting members 23A and 23B and the internal support structure 16 are slidably coupled to one another, in use, each respective element may slide along the length of the wind turbine blade 5A as said wind turbine blade 5A deforms under the aerodynamic forces exerted on it and the hub 4 rotates. The wind receiving fabric surface 15 is therefore free to deform in order to accommodate bending of the internal support structure 16 without said fabric surface 15 sagging between adjacent rib panels 17 because it is supported by the elongate fabric supporting members 23A and 23B, and because said elongate fabric supporting members 23A and 23B slide along the length of the blade 5A as the structure bends.

Figure 7:
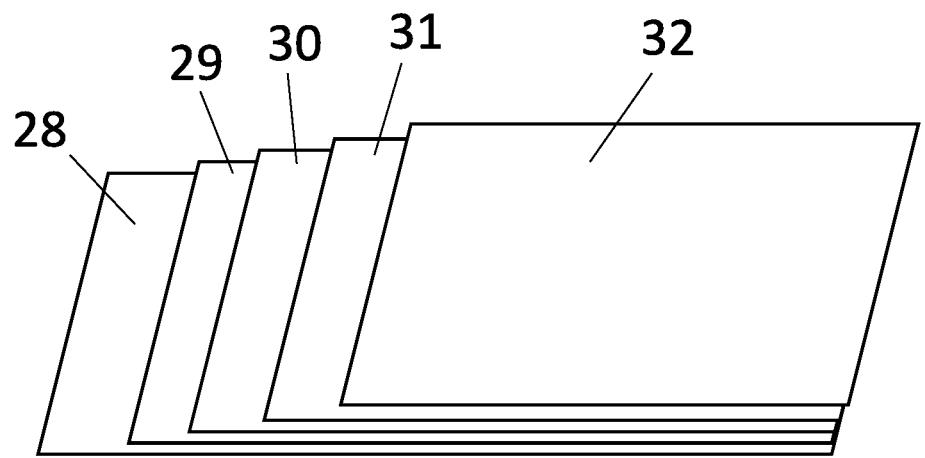
FIG. 7 is an exploded view of a laminated structure of the fabric skin of the wind turbine blade of FIG. 2.

Fabric sock 15 is formed from a laminated textile material. FIG. 7 shows the laminate structure of this textile material in more detail. The textile material comprises, in order, a Mylar (resin polyethylene terephthalate) base layer 28, a Technora (aramid) and Vectran (liquid crystal polymer fiber) woven composite layer 29, a Mylar (resin polyethylene terephthalate) film 30, a first Tedlar (polyvinyl fluoride) film 31 and a second Tedlar (polyvinyl fluoride) film 32.

Figure 8:
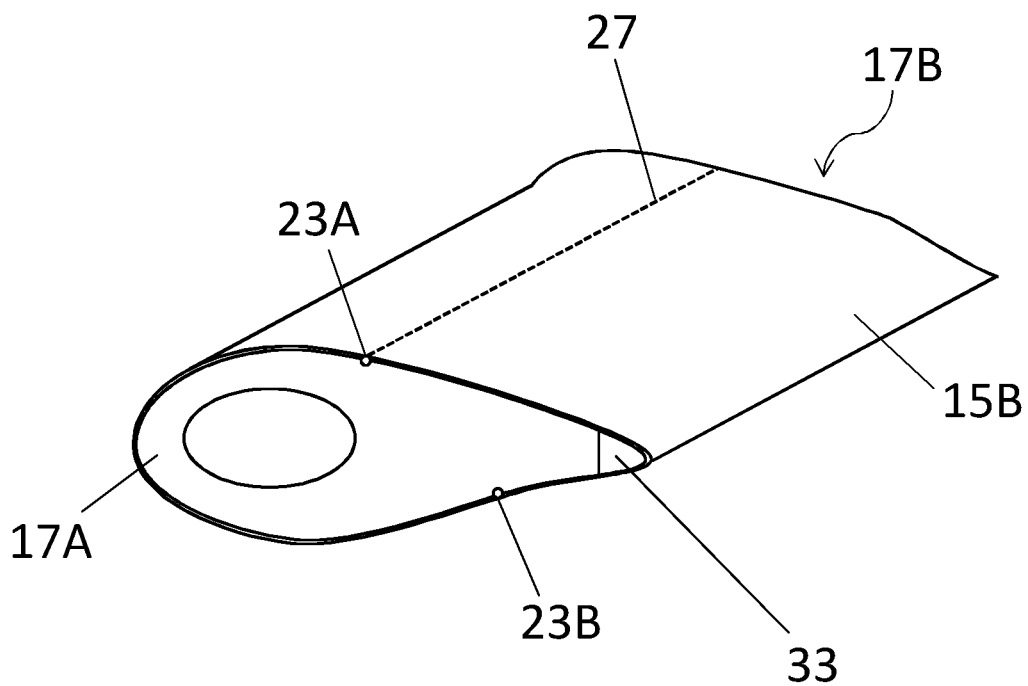
FIG. 8 is a perspective view of a section of the wind turbine blade of FIG. 2 further comprising a tension control member.

In order to achieve adjustable control of fabric tension in the fabric sock 15, tension control members may be included in the wind turbine blade structure. FIG. 8 shows a portion of the wind turbine blade 5A between rib panels 17A and 17B with a trailing edge beam 33 fitted. Trailing edge beam 33 extends along the trailing edge of the wind turbine blade 5A from the hub end 7 to the blade tip 8. Trailing edge beam 33 is located within the internal support structure 16, connected to a trailing edge end of each rib panel 17. Adjustment of trailing edge beam controls tension in fabric sock 15 in a transverse direction indicated by arrow 34, said transverse direction 34 being substantially perpendicular to the longitudinal axis of the carbon fibre pole 18.

Figure 9:
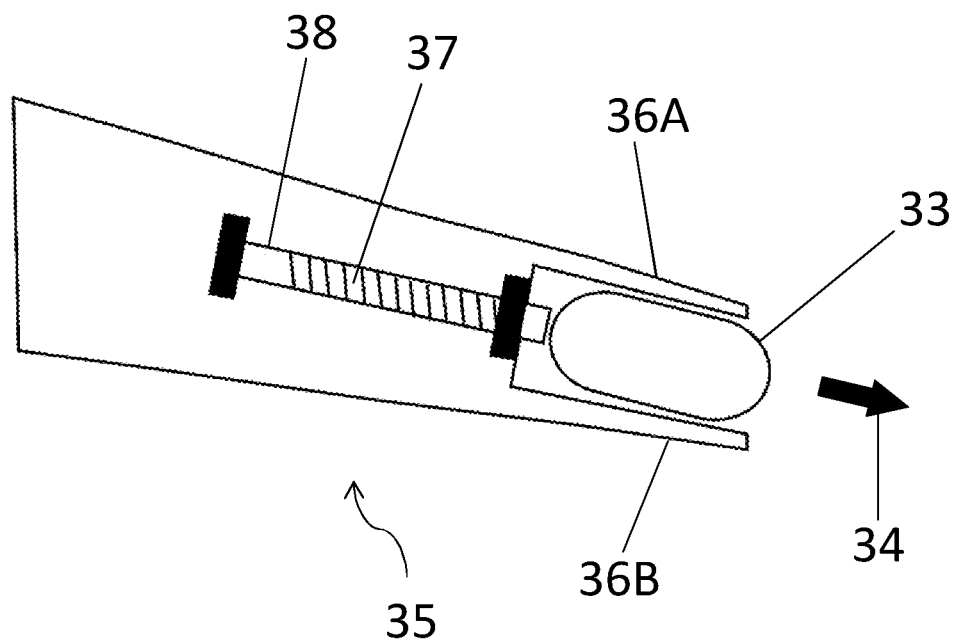
FIG. 9 is a cross section through the tension control member of FIG. 8.

A screw mechanism 35 for controlling adjustment of the trailing edge beam 33 is shown in FIG. 9. Training edge beam 33 is retained between two prongs 36A and 36B of the tapered trailing edge of rib panel 17A. A screw 37 is positioned within a cylindrical bore 38 extending from the tapered trailing edge of rib panel 17A in a direction towards the carbon fibre pole 18. Screw 37 and cylindrical bore 38 have cooperating, helically threaded surfaces. A torque applied to screw 37 in a first sense causes screw 37 to extend out of cylindrical bore 38 and to press against trailing edge beam 33, thereby causing trailing edge beam 33 to move in direction 34. As trailing edge beam 33 moves in direction 34, it impinges against fabric sock 15, thereby increasing fabric tension in said fabric sock 15 in a transverse direction. A torque applied to screw 37 in a second sense opposite said first sense causes screw 37 to retract within the cylindrical bore 38, thereby relieving pressure on trailing edge beam 33. As trailing edge beam 33 relaxes back from fabric sock 15, fabric tension in fabric sock 15 in the transverse direction is reduced. Adjustment of the positioning of the trailing edge beam may be controlled, potentially automatically, by a computer processor.

Figure 10:
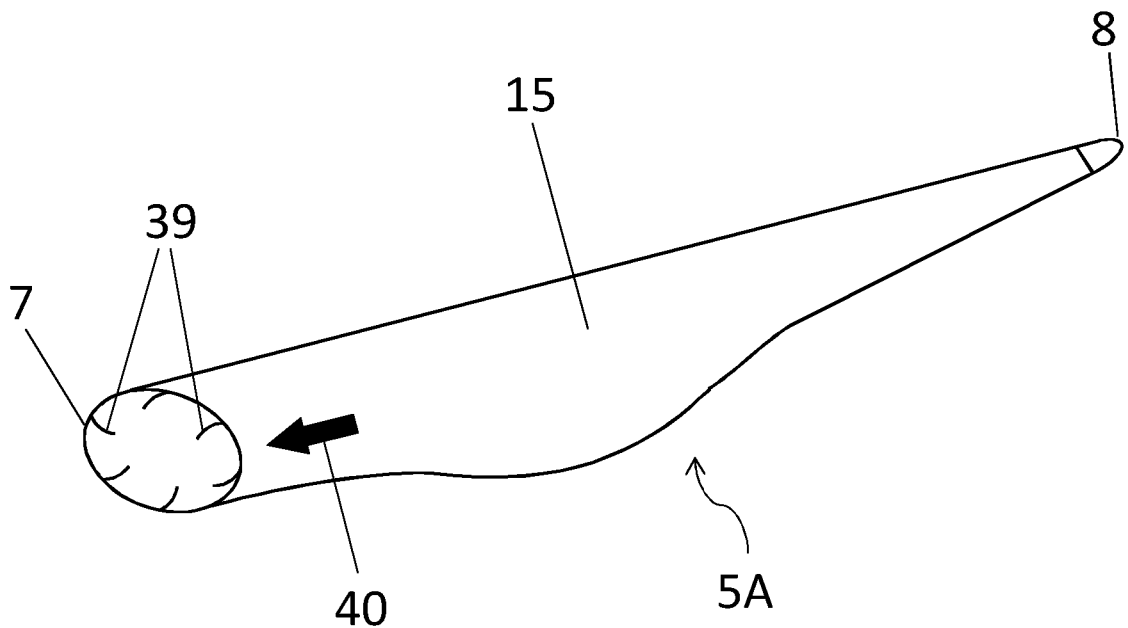
FIG. 10 is a perspective view of the wind turbine of FIG. 2 further comprising an alternative tension control member.
Figure 11:
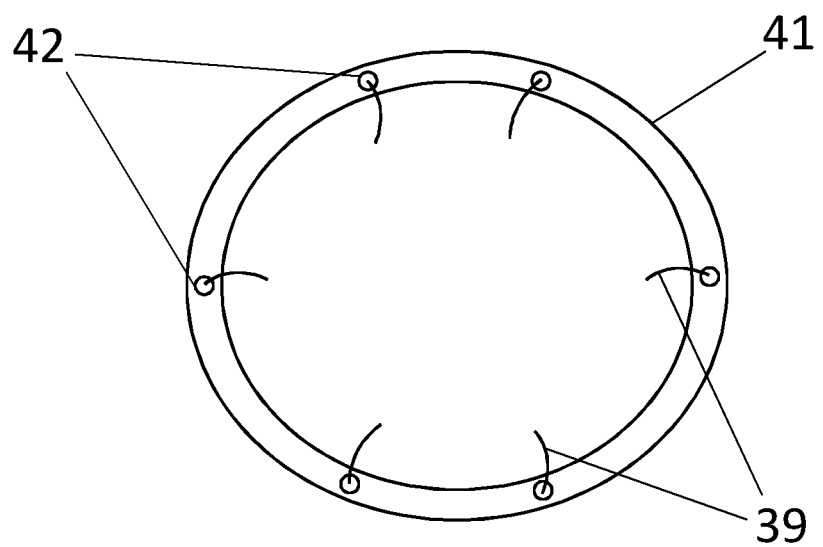
FIG. 11 is a side view of the wind turbine of FIG. 10.

FIG. 10 shows wind turbine blade 5A with tensioning cables 39 fitted. Each tensioning cable 39 extends from a hub end 7 edge of fabric sock 15. By pulling on tensioning cables 39, longitudinal forces may be exerted on said fabric sock 15, thereby increasing fabric tension in said fabric sock 15 in the longitudinal direction indicated by arrow 40. FIG. 11 shows how each tensioning cable 39 may be threaded through a tensioning ring 41 located at hub end 7 of the wind turbine blade 5A. Tensioning cables 39 may be pulled through apertures 42 of tensioning ring 41. Tensioning ring 41 may be configured to retain said tensioning cables 39 in place, thereby maintaining any applied longitudinal tension. Adjustment of the tensioning cables 39 may be controlled, potentially automatically, by a computer processor.

By controlling the fabric tension in the fabric sock 15 by way of either or both of said tension control members, the aerodynamic shape of the wind-receiving external surface 15 can be adjusted either before use of the wind turbine blade 5A or, in fact, during use. The aerodynamic shape of the wind-receiving surface 15, and the response of the wind-receiving surface 15 to air flowing thereacross, can therefore be optimised based on factors such as the instantaneous wind speed, wind direction, air pressure, temperature or speed of rotation of the rotor.

Further variations and modifications may be made within the scope of the invention herein disclosed.

Second Example Embodiment

Figure 12:
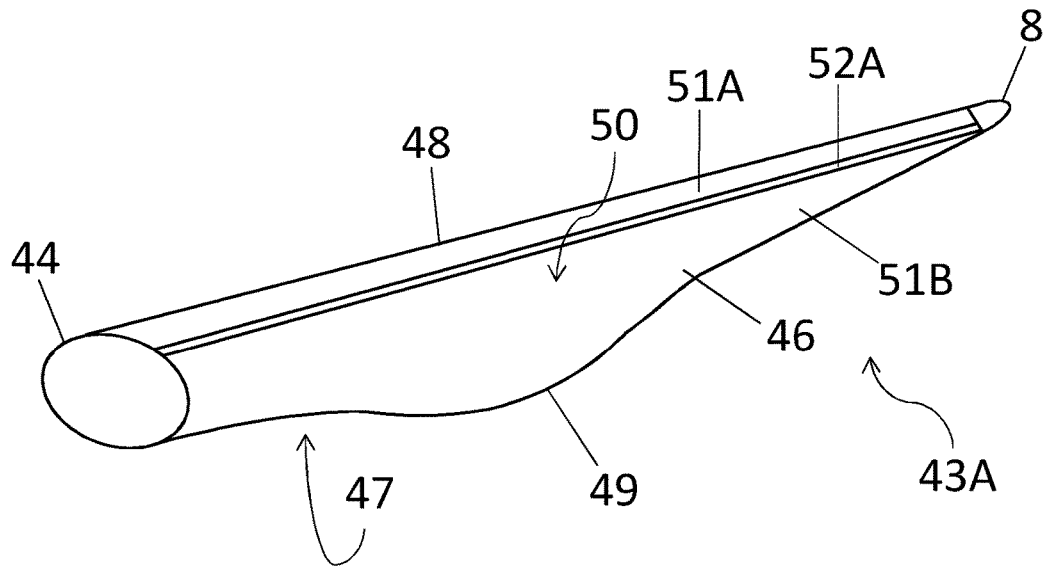
FIG. 12 is a perspective view of a wind turbine blade according to a second example embodiment of the invention.

An alternative example wind turbine blade 43A is shown in FIG. 12. Wind turbine blade 43A is interchangeable with wind turbine blade 5A in that wind turbine blade 43A may be connected to hub 4 of wind turbine 1 and functions in substantially the same manner as wind turbine blade 5A.

As shown in FIG. 12, wind turbine blade 43A extends between a hub end 44 and a blade tip 45. The hub end 44 is connected to the hub 4 when in use. Wind turbine blade 43A has a three-dimensional aerodynamic shape comprising a suction surface 46 and a pressure surface 47 which both extend between a leading edge 48 and a trailing edge 49 of the blade 43A. A wind-receiving surface 50 extends around the blade 43A. The wind-receiving surface 50 includes both the suction surface 46 and the pressure surface 47. The wind-receiving surface 50 is formed by a first fabric panel 51A and a second fabric panel 51B which extend along a length of the blade 43A from the hub end 44 to the blade tip 45 and which wrap around the blade 43A. The first and second fabric panels 51A and 51B are connected to one another along the length of the blade 43A from the hub end 44 to the blade tip 45 by an elongate connector 52A extending across the suction surface 46.

Wind turbine blade 43A has an internal skeleton structure substantially identical to internal skeleton structure 18 of wind turbine blade 43A shown in FIG. 3, consisting of multiple composite sandwich rib panels 19 extending from a carbon fibre pole 20.

Figure 13:
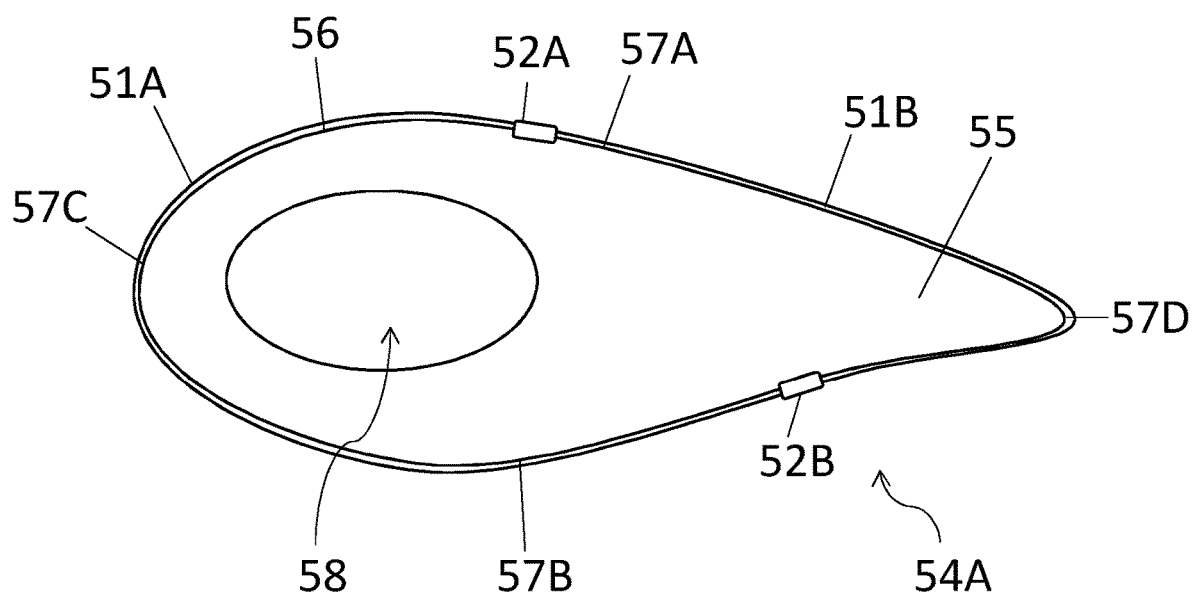
FIG. 13 is a cross section through a transverse rib panel of the wind turbine blade of FIG. 12.

FIG. 13 shows a rib panel 54A, substantially identical in shape to rib panel 17A of the first example embodiment, in more detail. Rib panel 54A consists of a composite sandwich panel 55 which, when viewed along a longitudinal axis of the blade 43A from the hub end 44 to the blade tip 45, has an aerodynamic profile defined by a panel edge 56. Panel edge 56 can be divided into suction surface edge portion 57A, pressure surface edge portion 57B, leading edge portion 57C and trailing edge portion 57D. An elliptical aperture 58 is provided through the thickness of the composite sandwich panel 55 configured to provide an interference fit around the elliptical pole 20.

When in use, the wind-receiving surface 50 comprising first and second fabric panels 51A and 51B is wrapped around and is supported by, in part, rib panel 54A. Fabric panels 51A and 51B are connected to one another along the longitudinal length of the blade 43A by elongate connector 52A. Elongate connector 52A is slidably attached to the suction surface edge portion 57A of composite sandwich panel 55. Fabric panels 51A and 51B are also connected to one another along the longitudinal length of the blade 6A by a second elongate connector 52B. Elongate connector 52B is slidably attached to the pressure surface edge portion 57B of composite sandwich panel 55. Elongate connectors 52A and 52B therefore ensure that the first and second fabric panels 51A and 51B together wrap completely around the composite sandwich panel 55. In particular, fabric panel 51A forms a continuous fabric surface across leading edge portion 57C of composite sandwich panel 55, and fabric panel 51B forms a continuous fabric surface across trailing edge portion 57D of composite sandwich panel 55.

Figure 14:
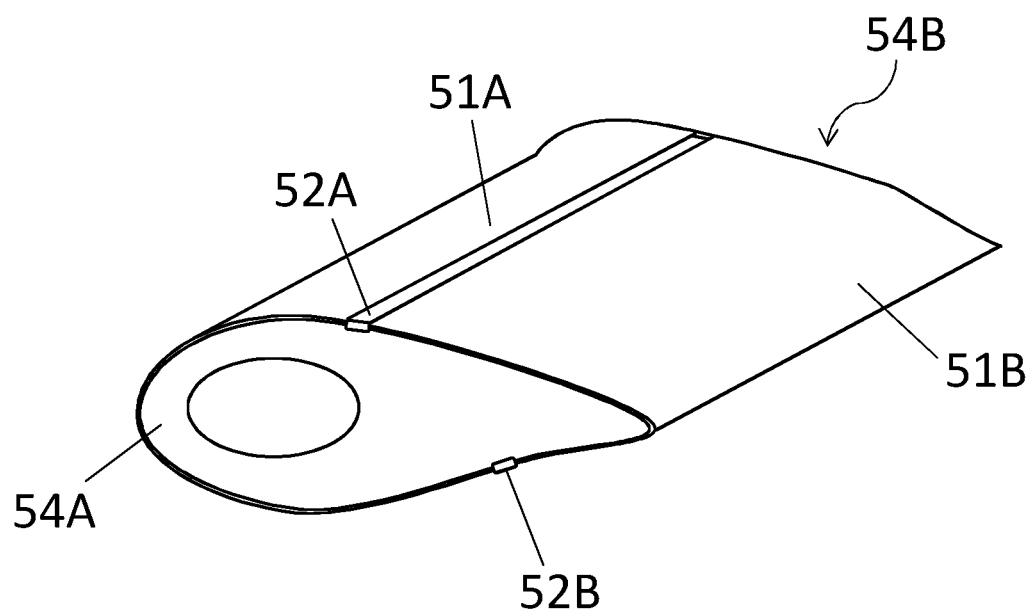
FIG. 14 is a perspective view of a section of the wind turbine blade of FIG. 12.

FIG. 14 shows a portion of the wind turbine blade 43A between rib panels 54A and 19B. Elongate connectors 52A and 52B are slidably attached to each rib panel in approximately equivalent positions around the panel edge of each said rib panel. Fabric panels 51A and 51B therefore wrap completely around each said rib panel. Fabric panels 51A and 51B are dimensioned and positioned so as to be pulled taught between adjacent rib panels along the longitudinal axis of the wind turbine blade 43A. The elongate connectors 52A and 52B are further configured to hold the fabric panels 51A and 51B under tension around the wind turbine blade 43A. Elongate connectors 52A and 52B further support the fabric panels 51A and 51B between each rib panel. The wind-receiving surface 50 formed by fabric panels 51A and 51B is therefore a taught, smooth, aerodynamic surface presenting few interruptions or features capable of disrupting the smooth flow of air thereacross.

Because the fabric panels 51A and 51B, the elongate connectors 52A and 52B and the internal support structure 16 are slidably coupled to one another, in use, each respective element may slide along the length of the wind turbine blade 43A as said wind turbine blade 43A deforms under the aerodynamic forces exerted on it and the hub 4 rotates. The wind receiving fabric surface 50 is therefore free to deform in order to accommodate bending of the internal support structure 53 without said fabric surface 50 sagging between adjacent rib panels because the elongate connectors 52A and 52B slide along the length of the blade 43A as the structure bends.

Both of the fabric panels 51A and 51B are formed from the same laminated textile material as fabric sock 15 of the first example embodiment, as illustrated in FIG. 6. Each of the fabric panels 51A and 51B is provided with two, substantially parallel bolt rope terminated edges.

Figure 15:
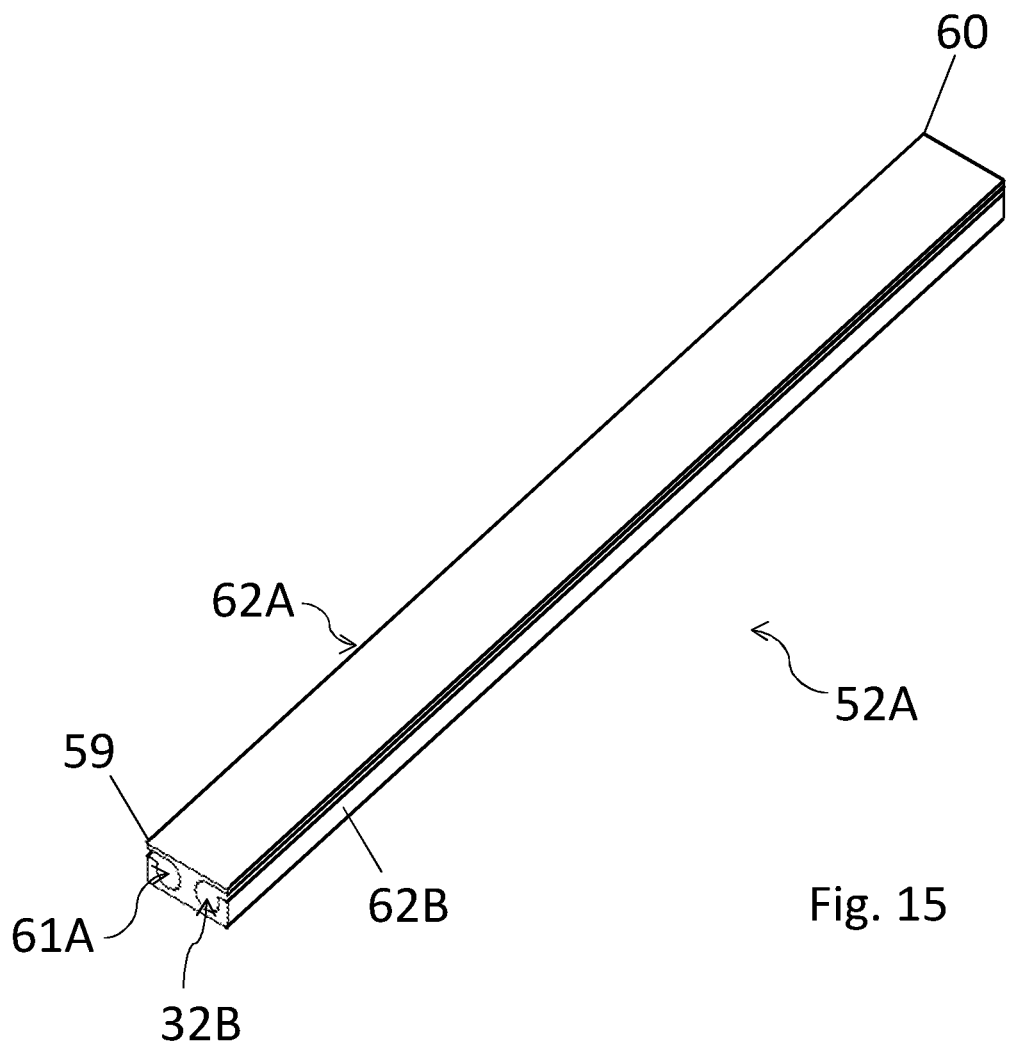
FIG. 15 is a perspective view of an elongate connector.

FIG. 15 shows elongate connector 52A in more detail (elongate connector 52B has a substantially identical shape). Elongate connector 52A extends from a hub end 59 to a blade tip end 60 and is formed from metal. Two hollow grooves 61A and 61B are provided along side walls 62A and 62B respectively, each for retaining a bolt rope terminated edge of fabric panel 51A or 51B.

Figure 16:
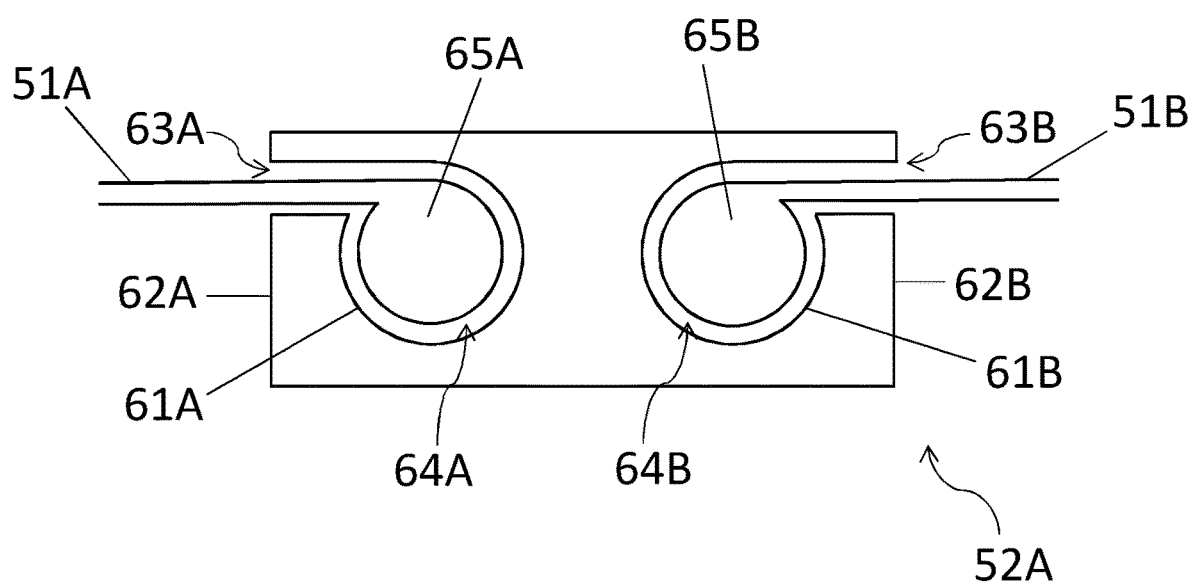
FIG. 16 is a cross section through an elongate connector of the wind turbine blade of FIG. 12.

FIG. 16 shows a cross section through elongate connector 52A retaining fabric panels 51A and 51B. Hollow groove 61A comprises an aperture 63A leading from side wall 62A to a cavity 64A. Similarly, hollow groove 61B comprises an aperture 63B leading from side wall 62B to a cavity 64B. A bolt rope terminated edge 65A of fabric panel 51A is retained within cavity 64A, and a bolt rope terminated edge 65B of fabric panel 51B is retained within cavity 64B. Fabric panels 51A and 51B are therefore restricted from moving in a direction perpendicular to side walls 62A and 62B (i.e. in a direction in the local plane of the wind-receiving surface 50).

Adjustable control of fabric tension in the first and second fabric panels 51A and 51B may be achieved by use of tension control members including the trailing edge beam 36 or tensioning cables 42 of the first example embodiment of the invention.

Further variations and modifications may be made within the scope of the invention herein disclosed.

The invention claimed is:

1. A wind turbine blade comprising an external skin that deforms under aerodynamic forces exerted upon it, which external skin comprises tensioned fabric supported along a majority of the length of the wind turbine blade by two or more elongate fabric supporting members, the external skin being connected to each of the two or more elongate fabric supporting members, wherein the external skin is slidably attached to each of the two or more elongate fabric supporting members so that they slide along the length of the blade as the blade bends when aerodynamic forces are applied.

2. The wind turbine blade according to claim 1 further comprising an internal support structure, wherein said two or more elongate fabric supporting members are slidably attached to said internal support structure such that each of the two or more elongate fabric supporting members is slidable along at least a portion of the length of the wind turbine blade.

3. The wind turbine blade according to claim 2, wherein each of the two or more elongate fabric supporting members is slidably mounted within a recess of the internal support structure.

4. The wind turbine blade according to claim 2, wherein the internal support structure comprises a longitudinal structural support member extending along at least a majority of the length of the wind turbine blade and a plurality of transverse structural support members, and wherein each of the two or more elongate fabric supporting members is slidably mounted within a recess or aperture of at least one of said transverse structural support members.

5. The wind turbine blade according to claim 4, wherein the longitudinal structural support member comprises a pole extending longitudinally along at least the majority of the length of the wind turbine blade, wherein the plurality of transverse structural support members comprises a plurality of ribs extending transversely from said pole, and wherein each of the two or more elongate fabric supporting members is slidably mounted within a recess or aperture of at least one of said ribs.

6. The wind turbine blade according to claim 1, wherein the external skin comprises tensioned fabric which extends along at least 80% of the length of the wind turbine blade, said tensioned fabric being supported along said at least 80% of the length of the wind turbine blade by the two or more elongate fabric supporting members which extend along said at least 80% of the length of the wind turbine blade.

7. The wind turbine blade according to claim 1, wherein each of the two or more elongate fabric supporting members comprises an elongate connector and wherein the external skin comprises two or more fabric panels connected to one another by said two or more elongate connectors along the majority of the length of the wind turbine blade.

8. The wind turbine blade according to claim 7, wherein the two or more fabric panels are held under tension by the two or more elongate connectors.

9. The wind turbine blade according to claim 7, wherein each of said two or more elongate connectors comprises first and second elongate channels, the first channel retaining an edge of one of the two or more fabric panels and the second channel retaining an edge of another of the two or more fabric panels.

10. The wind turbine blade according to claim 9, wherein the edge of one of the two or more fabric panels and the edge of another of the two or more fabric panels are both bolt rope terminated edges of said respective fabric panels.

11. The wind turbine blade according to claim 7, having more than two but fewer than six of said fabric panels and a corresponding number of elongate connectors therebetween.

12. The wind turbine blade according to claim 1, wherein said wind turbine blade extends longitudinally between a hub end portion and a blade tip portion, and wherein said external skin comprises a wind-receiving external surface comprising a suction surface and a pressure surface both extending between a leading edge and a trailing edge of the wind turbine blade, thereby defining an aerodynamic profile.

13. The wind turbine blade according to claim 12, wherein at least one of the two or more elongate fabric supporting members extends along a line of inflection of a concave portion of the pressure surface.

14. The wind turbine blade according to claim 12,
wherein each of the two or more elongate fabric supporting members comprises an elongate connector and wherein the external skin comprises two or more fabric panels connected to one another by said two or more elongate connectors along the majority of the length of the wind turbine blade;
and
wherein one of the two or more fabric panels forms a continuous fabric surface across the leading edge of the blade.

15. The wind turbine blade according to claim 1, further comprising one or more tension control members configured to vary tension in said external skin.

16. The wind turbine blade according to claim 15,
wherein each of the two or more elongate fabric supporting members comprises an elongate connector and wherein the external skin comprises two or more fabric panels connected to one another by said two or more elongate connectors along the majority of the length of the wind turbine blade;
wherein each of said two or more elongate connectors comprises first and second elongate channels, the first channel retaining an edge of one of the two or more fabric panels and the second channel retaining an edge of another of the two or more fabric panels;
wherein the edge of one of the two or more fabric panels and the edge of another of the two or more fabric panels are both bolt rope terminated edges of said respective fabric panels;
and
wherein one or more of said one or more tension control members is arranged along the trailing edge of the blade, thereby being adjustable to control tension in said external skin in a transverse direction.

17. The wind turbine blade according to claim 15,
wherein said wind turbine blade extends longitudinally between a hub end portion and a blade tip portion, and wherein said external skin comprises a wind-receiving external surface comprising a suction surface and a pressure surface both extending between a leading edge and a trailing edge of the wind turbine blade, thereby defining an aerodynamic profile;
and
wherein one or more of said tension control members is arranged at the hub end portion of the blade, thereby being adjustable to control tension in said external skin in a longitudinal direction.

18. The wind turbine blade according to claim 15, wherein the one or more tension control members comprise trailing edge beams or tension control cables.

19. The wind turbine blade according to claim 1, wherein said fabric comprises a laminate textile comprising alternating layers of woven or non-woven fabrics.

* * * * *